United States Patent
Miyasaka et al.

(10) Patent No.: US 9,381,546 B2
(45) Date of Patent: Jul. 5, 2016

(54) APPARATUS AND METHOD FOR SEPARATING MATERIAL

(71) Applicant: Panasonic Corporation, Osaka (JP)

(72) Inventors: Masatoshi Miyasaka, Osaka (JP); Tamao Kojima, Osaka (JP); Hideshi Ueda, Osaka (JP); Kenichiro Hatta, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/365,674

(22) PCT Filed: Jan. 23, 2014

(86) PCT No.: PCT/JP2014/000339
§ 371 (c)(1),
(2) Date: Jun. 16, 2014

(87) PCT Pub. No.: WO2014/174736
PCT Pub. Date: Oct. 30, 2014

(65) Prior Publication Data
US 2015/0231671 A1    Aug. 20, 2015

(30) Foreign Application Priority Data
Apr. 25, 2013   (JP) .................. 2013-093007

(51) Int. Cl.
*B07C 5/36* (2006.01)
*B07C 5/34* (2006.01)
*B07C 5/02* (2006.01)

(52) U.S. Cl.
CPC . *B07C 5/365* (2013.01); *B07C 5/34* (2013.01); *B07C 5/02* (2013.01)

(58) Field of Classification Search
CPC ........ B07C 5/363; B07C 5/365; B07C 5/366; B07C 5/367; B07C 5/368; B07C 5/02; B07B 4/025
USPC .................. 209/44.2, 639, 644, 932
See application file for complete search history.

(56) References Cited

U.S. PATENT DOCUMENTS 5,297,667 A * 3/1994 Hoffman et al. .............. 198/493
6,003,681 A * 12/1999 Wilbur et al. ................. 209/639

(Continued)

FOREIGN PATENT DOCUMENTS

JP   2010-279921   12/2010
JP   2011-173049    9/2011

OTHER PUBLICATIONS

International Search Report issued Mar. 4, 2014 in International (PCT) Application No. PCT/JP2014/000339.

*Primary Examiner* — Joseph C Rodriguez
(74) *Attorney, Agent, or Firm* — Wenderoth, Lind & Ponack, L.L.P.

(57) ABSTRACT

A separation method includes: conveying a separation subject comprising a group of pieces placed on a conveyor in one direction; detecting, by a detecting device, compositions of pieces in the group of pieces placed on the conveyor; generating, by a blower, airflow at an end portion of the conveyor in a conveying direction in which the conveyor conveys the separation subject, the airflow having a velocity matching or substantially matching a conveying speed of the conveyor; stabilizing the airflow by a current plate placed along a trajectory of the group of pieces; and by a jetting device, obtaining position information of a piece of a particular material detected, and jetting pulse air toward the piece of the particular material when the piece of the particular material, which is travelling through air from the conveyor and whose travel is assisted by the airflow, passes by the jetting device.

2 Claims, 14 Drawing Sheets

(56) References Cited

U.S. PATENT DOCUMENTS

| | | | |
|---|---|---|---|
| 6,250,472 B1* | 6/2001 | Grubbs et al. | 209/44.2 |
| 6,891,119 B2* | 5/2005 | Grubbs | B03B 9/061 |
| | | | 209/587 |
| 7,816,616 B2* | 10/2010 | Kenny et al. | 209/576 |
| 7,942,273 B2* | 5/2011 | Campbell et al. | 209/631 |
| 8,286,800 B2* | 10/2012 | Kojima et al. | 209/631 |
| 8,602,219 B2* | 12/2013 | Guptail et al. | 209/44.2 |
| 9,199,283 B2* | 12/2015 | Kojima | B07C 5/368 |
| 2007/0158245 A1 | 7/2007 | Kenny et al. | |
| 2014/0197078 A1* | 7/2014 | Kojima et al. | 209/552 |

* cited by examiner

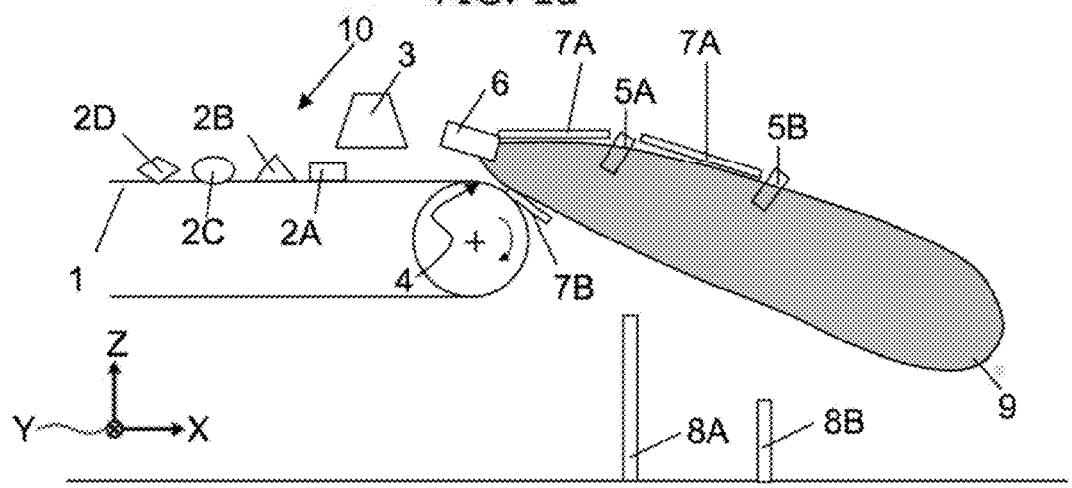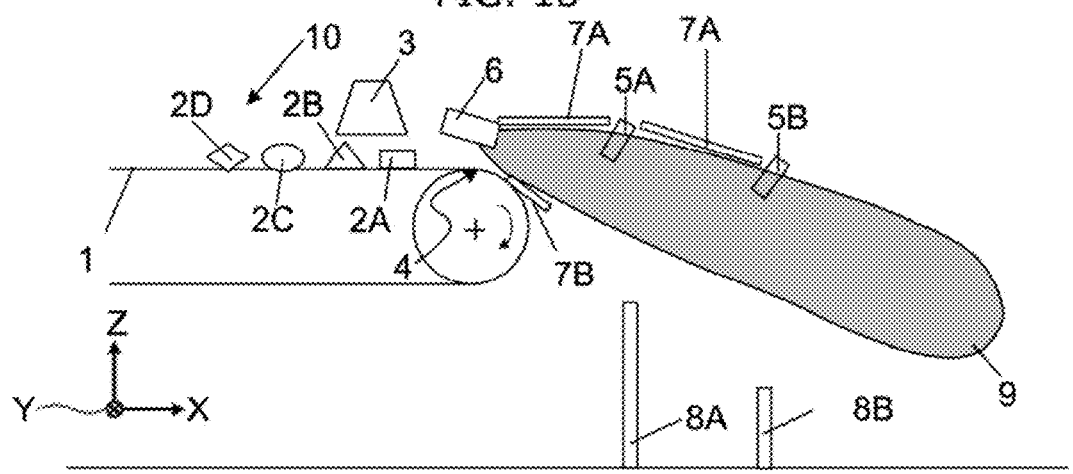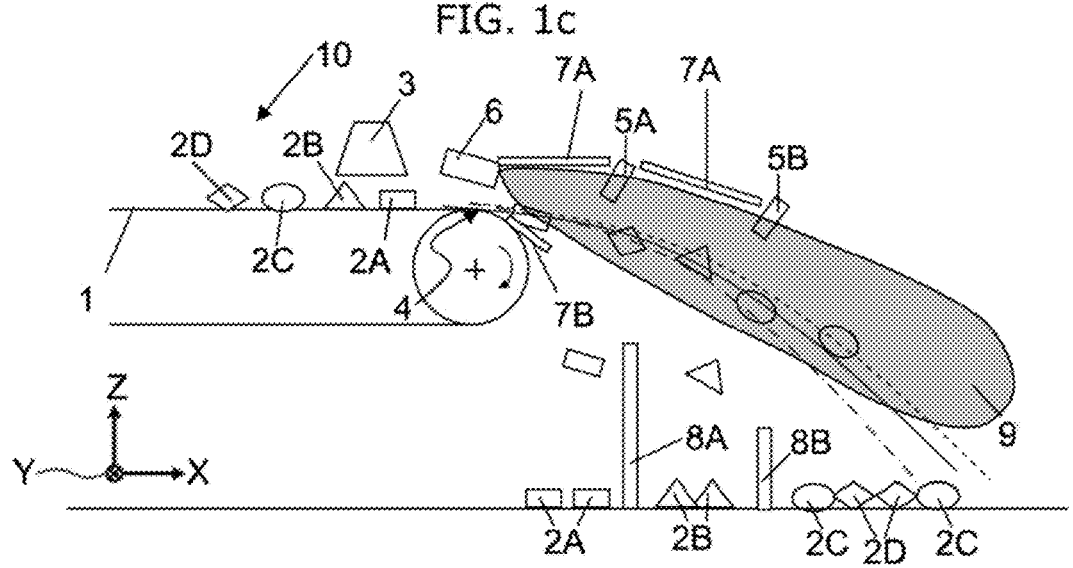

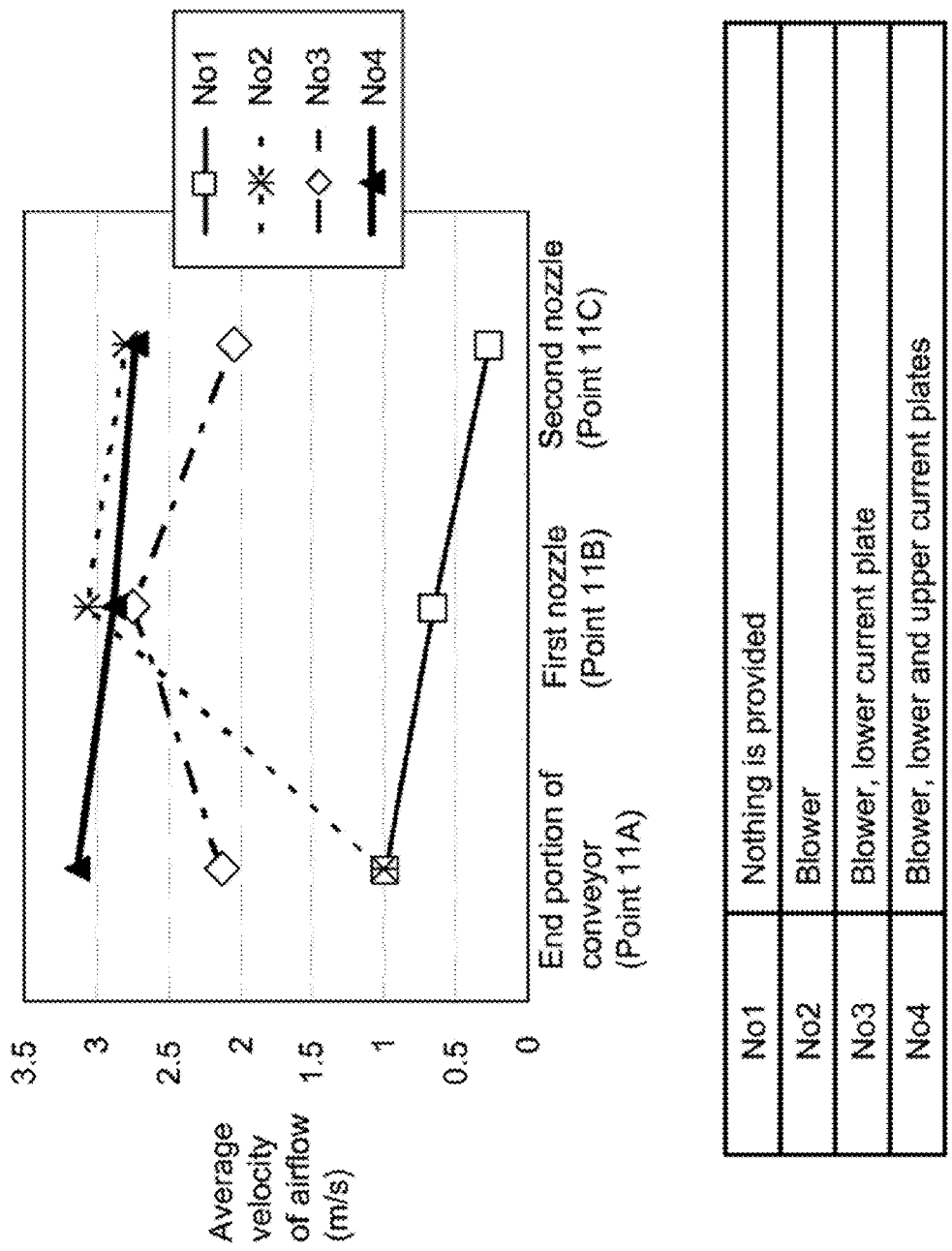

Conveying speed 1F > 6F

Conveying speed 1F = 6F

Conveying speed 1F < 6F

FIG. 13

Conveying speed of conveyor   3 m/s

| Velocity of airflow at point 11A (m/s) | Margin of error in travel (mm) |
|---|---|
| 0.99 | 94 |
| 2.51 | 38 |
| 3.18 | 24 |
| 3.45 | 44 |
| 3.68 | 68 |

FIG. 14

Conveying speed of conveyor   2 m/s

| Velocity of airflow at point 11A (m/s) | Margin of error in travel (mm) |
|---|---|
| 0.58 | 64 |
| 1.54 | 28 |
| 2.12 | 18 |
| 2.62 | 34 |
| 2.98 | 48 |

FIG. 15

| | Velocity of airflow at point 11A | Separation of PP (first group of nozzles) | | Separation of ABS (second group of nozzles) | |
|---|---|---|---|---|---|
| | | Separation purity | Recovery yield | Separation purity | Recovery yield |
| Present invention | 3.18 m/s | 99.6 % | 91.2 % | 99.5 % | 86.0 % |
| Conventional example | 0.99 m/s (Without blower) | 98.7 % | 90.4 % | 93.3 % | 80.8 % |

APPARATUS AND METHOD FOR SEPARATING MATERIAL

BACKGROUND OF INVENTION

Technical Field

The present invention relates to separation techniques for separating pieces of a particular material from a separation subject including pieces of different materials and, in particular, to a separation technique for separating pieces of a particular class of resin from a separation subject obtained by crushing, for example, used home appliances.

BACKGROUND ART

Economic activities in recent years represented by mass production, mass consumption, and mass disposal have been causing global environmental problems such as global warming and depletion of resources. Under such circumstances, in an effort to build a recycling-oriented society, attentions have been paid to recycling of home appliances. Thus, recycling of used home appliances such as air conditioners, televisions, refrigerators/freezers, and washing machines has gradually become an obligation.

Unneeded home appliances have been recycled by crushing them into small pieces in home appliance recycling plants and separating the small pieces by material type, using magnetism, wind, oscillation, and others. In particular, use of a specific gravity separation device or a magnetic separation device can separate small pieces made of metal by material type such as iron, copper, and aluminum in high purity. This achieves high recycling rate.

Meanwhile, in resin materials, small pieces formed of polypropylene (hereinafter, referred to as PP) having a low specific gravity are separated from a component having a high specific gravity through gravity separation using water, and recovered with a relatively high purity. However, the gravity separation using water has major problems below. A large amount of wastewater is produced. In addition, it is not possible to separate small species having similar specific gravities, such as small pieces formed of polystyrene (hereinafter, referred to as PS) and small pieces formed of acrylonitrile-butadiene-styrene (hereinafter, referred to as ABS).

Patent Literature 1 (PTL 1) suggests a separation method in view of the above problems related to recycling of resin materials.

The technique disclosed in PTL 1 detects a material type using a detecting device, which allows small pieces of resin materials inseparable by the gravity separation to be separated.

To be specific, in the technique disclosed in PTL 1, the detecting device detects one by one the material types of the separation subjects conveyed on a conveyor, and pieces detected as a particular resin are separated from the trajectories of the separation subjects thrown forward from a conveying end of the conveyor. In the separation method, pulse air is discharged from nozzles provided above or below the trajectories of the separation subjects so as to blow off only the small pieces of a particular material and separate them from the rest of the separation subjects. Moreover, an air supplying device using a gas source for conveying materials is provided.

The conventional method of separating separation subjects disclosed in PTL 1 will be described in further detail with reference to drawings.

FIGS. 10a to 10c and FIG. 11 illustrate an embodiment of the conventional method of separating separation subjects.

FIGS. 10a to 10c are side views illustrating a process for separating small pieces 2A of a particular target material from small pieces 2A, 2B, 2C, and 2D conveyed by a conveyor 1. FIG. 11 is a plan view.

FIG. 10a illustrates the small pieces 2A, 2B, 2C and 2D as separation subjects conveyed by the conveyor 1, and the small pieces 2A is the particular target material. The reference sign "3" in FIG. 10a denotes a detecting device. The reference sign "4" in FIG. 10a denotes the conveying end of the conveyor 1 from which the small pieces 2A, 2B, 2C, and 2D are thrown forward. The reference sign "5" in FIG. 10a denotes a group of nozzles provided in the width direction of the conveyor 1 to separate the small pieces 2A of the particular material from the trajectories of the small pieces 2A, 2B, 2C, and 2D which have been thrown forward from the conveying end 4. The reference sign "8" in FIG. 10a denotes a separation plate for separating the small pieces 2A of the particular material which have been separated from the trajectories of the small pieces 2A, 2B, 2C, and 2D. It should be noted that FIG. 10a is a side view and FIG. 11 is a plan view of the same scene as the scene illustrated in FIG. 10a.

In FIG. 10b, the detecting device 3 distinguishes the material types and shapes of the separation subjects 2A, 2B, 2C, and 2D which have passed under the detecting device 3.

In FIG. 10c, the small pieces 2A, 2B, 2C, and 2D distinguished by the detecting device 3 are being thrown forward from the conveying end 4. Furthermore, when the small pieces 2A of the particular target material pass below the group of nozzles 5, pulse air is discharged only from a nozzle corresponding to the small pieces 2A, in the group of nozzles 5. This blows off and separates the small pieces 2A of the particular target material from the trajectories of the small pieces 2A, 2B, 2C, and 2D.

Moreover, representative trajectories of the small pieces 2A, 2B, 2C, and 2D thrown forward from the conveying end 4 of the conveyor 1 are represented by a solid line, a broken line, and a dashed-dotted line.

Thus, according to the conventional separation method disclosed in PTL 1, the detecting device and pulse air can separate pieces of a particular material from a separation subject. Therefore, it is possible to separate materials made of PS and ABS having similar specific gravities.

It should be noted that in the conventional separation method disclosed in PTL 1, pieces of a particular material are separated by the separation process at one time. Therefore, the separation process is performed several times to separate pieces of more than one particular material from the separation subject.

CITATION LIST

Patent Literature

[PTL 1] U.S. patent application publication number 2007/0158245

Technical Problem

It is important to ensure the accuracy of discharge of pulse air by which a target subject is isolated, to improve the purity of a recycling material by the conventional separation method disclosed in PTL 1 in an effort to ensure purity as a renewable recycling material. To achieve this, it is preferable that the accuracy of discharge be improved by stabilizing the trajectories of subjects having different sizes and shapes.

Preferably, pieces of two or more particular materials should be separated at one time to improve the efficiency of separation. Also in this case, it is preferable that the accuracy of discharge be improved.

To separate the pieces of two or more particular materials by a separation process at one time, it is necessary to provide at least two independent groups of air nozzles along the trajectories of the pieces as separation subjects, and separate the pieces by material type from the trajectories of the pieces as the separation subjects, by the groups of nozzles discharging pulse air.

With reference to the drawings, the following describes in detail a process for concurrently separating pieces of two or more particular materials by the separation process at one time, using the conventional method disclosed in PTL 1.

FIGS. 12a to 12c illustrate an embodiment of the separation method for concurrently separating pieces of two or more particular materials by the separation process at one time. FIGS. 12a to 12c illustrate a process for separating small pieces 2A of the particular target material and small pieces 2B of a particular target material, from small pieces 2A, 2B, 2C, and 2D as separation subjects conveyed by the conveyor 1.

FIG. 12a illustrates the small pieces 2A, 2B, 2C, and 2D as the separation subjects conveyed by the conveyor 1. The small pieces 2A and the small pieces 2B are particular target materials. The detecting device 3 and the conveying end 4 from which the small pieces 2A, 2B, 2C, and 2D as the separation subjects are thrown forward are the same as those shown in FIGS. 9a to 9c. The reference signs 5A and 58B in FIG. 12a denote groups of nozzles provided in the width direction of the conveyor 1 for separating the small pieces 2A and 2B of particular materials from the trajectories of the small pieces 2A, 2B, 2C, and 2D thrown forward from the conveying end 4. The reference signs 8A and 88 in FIG. 12a denote separation plates for separating the small pieces 2A and 2B of particular materials which have been separated from the trajectories of the small pieces 2A, 2B, 2C, and 2D as the separation subjects.

In FIG. 12b, the detecting device 3 is distinguishing the material types and shapes of the small pieces 2A, 2B, 2C, and 2D as the separation subjects which have passed under the detecting device 3.

In FIG. 12c, the small pieces 2A, 2B, 2C, and 2D as the separation subjects distinguished by the detecting device 3 are being thrown forward from the conveying end 4. Furthermore, pulse air is discharged when the small pieces 2A and 2B of particular target materials pass below the groups of nozzles 5A and 5B. Thus, the small pieces 2A and 2B of particular target materials are separated from the trajectories of the small pieces 2A, 2B, 2C, and 2D as the separation subjects. The solid line, broken line, and dashed-dotted line represent the representative trajectories of the small pieces 2A, 2B, 2C, and 2D as the separation subjects thrown forward from the conveying end 4.

Differences in shape and specific gravity cause margin of error in the trajectories of the small pieces 2A, 2B, 2C, and 2D as the separation subjects thrown forward from the conveying end 4. Moreover, the margin of error increases as the small pieces move away from the conveying end 4. For example, a material with a small bulk density such as urethane foam has a large drag force. Thus, the trajectory of such material is represented by the dashed-dotted line illustrated in FIG. 12c, and the material tends to fall near the conveyor 1. Moreover, a material such as a sheet resin material having a small thickness and a large area may ascend by a lift force, and the trajectory of such material may be represented by the dotted line in FIG. 12c. Thus, the accuracy of separation decreases in a place distant from the conveying end 4 due to margin of error in trajectories.

In PTL 1, a gas source for conveying materials is used to smooth the conveyance. Here, the gas source conveys materials to separate pieces of a particular material from the falling paths of pieces of other materials when these pieces are thrown forward from the conveying end. However, the velocity of airflow is disturbed due to airflow occurring along the surface of a roller. Thus, margin of error in the trajectories of the small pieces cannot be decreased. That is, small pieces as separation subjects cannot be separated with high degree of accuracy. Since the purity is low, the separated recovered pieces cannot be used again as recycling materials. Therefore, it is important to stabilize the trajectories of small pieces as the separation subjects to concurrently separate two or more particular materials with high degree of accuracy by the separation process at one time.

In view of the above conventional problems, the present invention provides a separation apparatus and a separation method with high separation efficiency and high degree of accuracy.

A required separation process differs depending on the separation subject. However, the following describes a problem which arises in separation of pieces of two or more particular materials at one time, which requires a high level of technical difficulty. It should be noted that the following description is also applied to the case where pieces of a particular material are separated from pieces of other materials by the separation process at one time.

SUMMARY OF INVENTION

Solution to Problem

To solve the above problems, a separation method according to the present invention is a separation method for separating a piece of a particular material and a piece of other material which are mixed in a separation subject, the separation method including: conveying the separation subject placed on a conveyor in one direction; detecting, by an detecting device, a composition of the piece of the particular material placed on the conveyor; generating, by a blower, airflow at an end portion of the conveyor in a conveying direction in which the conveyor conveys the separation subject, the airflow having a velocity matching or substantially matching a conveying speed of the conveyor; stabilizing the airflow by a current plate placed along a trajectory of the separation subject; and by a jetting device, obtaining position information of the piece of the particular material detected, and jetting pulse air toward the piece of the particular material when the piece of the particular material which is travelling through the air from the conveyor and whose travel is assisted by the airflow passes by the jetting device.

Moreover, the airflow may be generated by the blower such that a value of B/A falls within plus and minus 0.15 of 1, where the conveying speed of the conveyor is A m/s, and the velocity of the airflow is B m/s at the end portion of the conveyor in the conveying direction.

Moreover, a direction of the airflow may match a direction in which the separation subject is thrown forward, at the end portion of the conveyor in the conveying direction.

Moreover, to solve the above problems, a separation apparatus according to the present invention is a separation apparatus for separating a piece of a particular material and a piece of other material which are mixed in a separation subject. The separation apparatus includes: a conveyor for conveying the separation subject placed on the conveyor in one direction; a detecting device which detects a composition of the piece of the particular material placed on the conveyor; a jetting device which obtains positional information of the piece of the particular material detected, and jets pulse air toward the piece of the particular material when the piece of the particular material travelling through the air from the conveyor passes by the jetting device; a blower for generating airflow at an end portion of the conveyor in a conveying direction in which the conveyor conveys the separation subject, the airflow having a velocity matching or substantially matching a conveying speed of the conveyor; and a current plate placed along a trajectory of the separation subject.

Moreover, the blower may generate the airflow such that a value of B/A falls within plus and minus 0.15 of 1, where the conveying speed of the conveyor is A m/s, and the velocity of the airflow is B m/s at the end portion of the conveyor in the conveying direction.

Moreover, the blower may generate the airflow in a direction matching a direction in which the separation subject is thrown forward, at the end portion of the conveyor in the conveying direction.

Advantageous Effects of Invention

The present invention can decrease margin of error in the trajectories of pieces, significantly improve the separation accuracy of pieces of a particular material, improve recycling quality and productivity, and expand items separated for recycling.

BRIEF DESCRIPTION OF DRAWINGS

FIG. 1a is a side view illustrating a separation apparatus of the present invention.

FIG. 1b is a side view illustrating the separation apparatus of the present invention.

FIG. 1c is a side view illustrating the separation apparatus of the present invention.

FIG. 4 illustrates the relationship of average velocities at respective points in the trajectory direction in which pieces travel, when the availability of a blower or a current plate in the present invention was changed.

FIG. 13 is a table illustrating a result obtained by measuring margin of error in trajectories for the velocities of airflow.

FIG. 14 is a table illustrating results obtained by measuring margin of error in trajectories for the velocities of airflow.

FIG. 15 is a table illustrating the results of separation purity and recovery yield.

DESCRIPTION OF EMBODIMENTS

With reference to the drawings, the following describes an embodiment of a separation method and a separation apparatus according to the present invention. It should be noted that the embodiment below is described for illustrative purposes only, to explain a separation method and a separation apparatus according to the present invention. Therefore, the scope of the present invention is defined by the wording of the claims with reference to the following embodiment, and the present invention is not limited only to the following embodiment. Thus, among the structural elements in the embodiment below, the structural elements not recited in the independent claims representing the superordinate concept of the present invention are not necessarily needed to achieve the problem(s) of the present invention, but are used to form a more preferable embodiment.

FIGS. 1a to 1c are side views of a separation apparatus.

Figure 2:
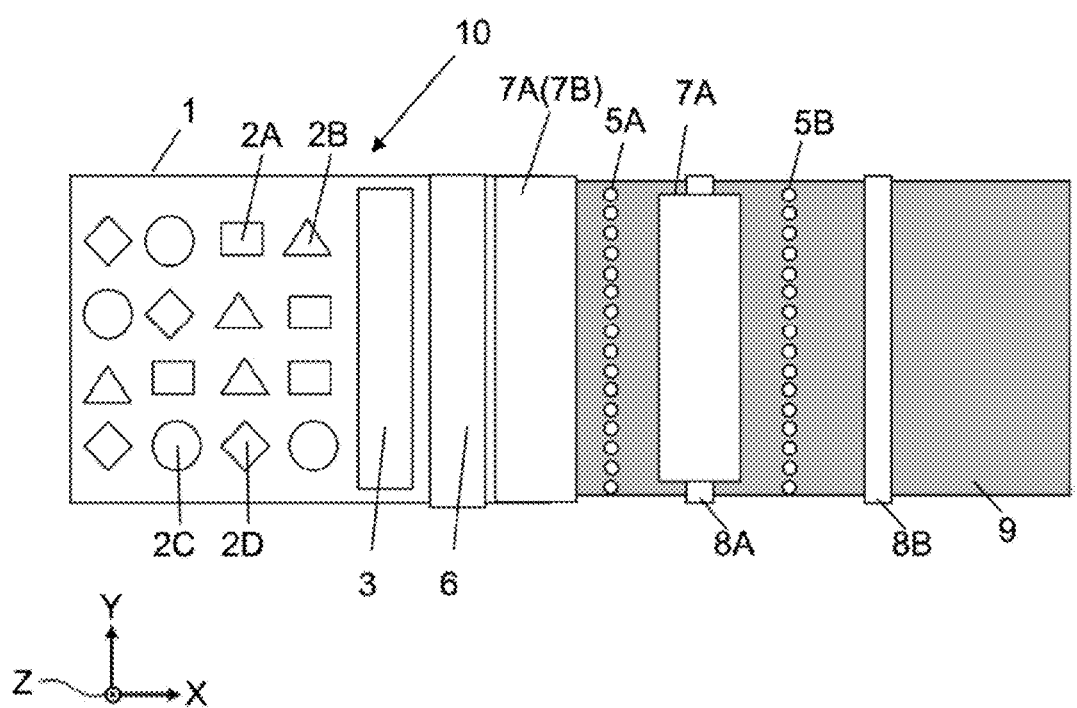
FIG. 2 is a plan view illustrating the separation apparatus of the present invention.

FIG. 2 is a plan view of the separation apparatus.

As illustrated in these figures, a separation apparatus 10 individually separates first pieces 2A of a first material and second pieces 2B of a second material, from a group of pieces 2 as a separation subject including the first pieces 2A of the particular material and the second pieces 2B of the particular material. The separation apparatus 10 includes a conveyor 1, a detecting device 3, a blower 6, and a current plate 7. In the present embodiment, the separation apparatus 10 includes an upper current plate 7A and a lower current plate 7B as the current plate 7. The separation apparatus 10 further includes a first separation plate 8A and a second separation plate 8B as a separation plate 8. Moreover, the separation apparatus 10 has a first separation space and a second separation space as side-by-side spaces in the direction in which the conveyor 1 conveys the separation subject (the X-axis positive direction in the figures), ahead of a conveying end 4.

The type of a particular material is not limited to, for example, resin, metal, and nonferrous metal. It should be noted that most types of pieces of particular materials may be distinguishable by the detecting device 3. The particle diameters of the pieces of particular materials are not limited.

However, a general particle size falls within the range from 5 mm to 100 mm, i.e., the range of the size of a particle represented by a crushed item obtained from home appliance recycling products. The densities (compositions) of the pieces of particular materials often fall within the range of 0.9 to 1.3 g/cm$^3$. The following describes separation subjects most densities of which fall within the range of 0.9 to 1.3 g/cm$^3$ and the material types of which are thermoplastic resin.

The conveyor 1 conveys the pieces 2A to 2D placed on the conveyor 1 making up the group of pieces 2, in one direction (the X-axis positive direction in the figures). In the present embodiment, a belt conveyor is used as the conveyor 1. The conveying end 4 of the conveyor 1 is at the end of the conveyor 1 toward which the pieces 2A, 2B, 2C, and 2D as separation subjects are conveyed. The pieces 2A, 2B, 2C, and 2D which have passed the conveying end 4 are thrown into the air.

The detecting device 3 distinguishes the material type of the first pieces 2A, the material type of the second pieces 2B, and other material types. The present embodiment employs a near infrared sensor, and uses a PP or ABS thermoplastic resin as the type of a particular material. The detecting device 3 can detect the type of the particular material among the separation subjects by checking a light source which emits a particular wavelength range (e.g., near infrared area), a near infrared sensor for taking in reflected light, a waveform spectrum preregistered for a waveform spectrum obtained by the near infrared sensor.

It should be noted that the detecting device 3 may distinguish the first pieces 2A and the second pieces 2B of the particular materials and pieces 2C and pieces 2D of other materials, based on different wavelength ranges, shapes, and colors. The detecting device 3 may be a sensor having the best sensitivity among a visible light sensor, a near infrared sensor, a mid infrared sensor, an X-ray sensor, and others for image recognition, or may be obtained by combining these sensors. Moreover, the detecting device 3 may distinguish separation subjects by a transmission type method rather than a reflection type method, i.e., may select a method of receiving light, depending on the separation subject (type of a particular material).

For the separation apparatus 10 according to the present embodiment, the conveyor 1 conveys, as a belt conveyor, the pieces 2A to 2D included in the group of pieces 2 as a separation subject, in one direction (the X-axis positive direction in the figures). The detecting device 3 can obtain a series of signals obtained by scanning, with a multi-rotary mirror, in the direction crossing the direction in which the belt conveyor conveys the separation subject (the width direction of the conveyor 1, i.e., the Y-axis direction in the figures), and distinguish the pieces of positional information of the first pieces 2A and the second pieces 2B (positional information in the width direction of the conveyor 1) from the pieces of positional information of the other pieces 2C and 2D. Therefore, in the present embodiment, the detecting device 3 also serves as a positional information obtaining unit. It should be noted that the detecting device 3 may select an appropriate method of detecting positional information, depending on the separation subject, from among various methods including laser scanning such as galvano scanning and line sensor scanning.

The blower 6 generates airflow 9 in the direction in which the group of pieces 2 travels from the detecting device 3 of the conveyor 1 toward the conveying end 4 (direction in which the conveyor 1 conveys the separation subject), along the surface across which the pieces 2A to 2D (the group of pieces 2) are conveyed, i.e., along the surface (upper surface) of conveyor 1.

The blower 6 for supplying the airflow 9 includes a slit nozzle head which has a slit opening extending in the width direction of the conveyor 1 (the Y-axis direction in the figures). The slit nozzle head of the blower 6 is provided above the conveyor 1, and has an opening shape allowing the airflow 9 to be supplied to a range greater than or equivalent to the effective width of the conveyor 1, in the conveying direction of the conveyor 1 (the X-axis positive direction in the figures), along the surface across which the pieces are conveyed. Here, the effective width is a maximum width across which the group of pieces 2 can be conveyed. Preferably, the width of the airflow 9 from the blower 6 should be not less than the effective width of the conveyor so that the velocity of the airflow is unified. This is because there is resistance on the interface.

Moreover, it is preferable that the blower 6 be provided near the end portion in the conveying direction of the conveyor 1 (e.g., in an area above the conveying end 4 in the conveying direction of the conveyor 1). Thus, it is possible to easily and accurately control the velocity of the airflow which the blower 6 generates in the end portion in the conveying direction of the conveyor 1, i.e., at the conveying end 4.

The blower 6 may include a nozzle such as a slit nozzle head movable to a particular place and move the nozzle based on positional information or may change the orientation of the nozzle.

The first separation space and the second separation space (hereinafter, also collectively referred to as "separation space") are spaces (spatial areas) to change the falling paths of the first pieces 2A and the second pieces 2B by generating a gas such as the air in a pulse-like manner, and blowing off the first pieces 2A and the second pieces 2B which have been thrown forward from the conveying end 4 of the conveyor 1 and are travelling in the air, based on the pieces of positional information of the first pieces 2A and the second pieces 2B obtained by the detecting device 3. In the present embodiment, a first jetting device and a second jetting device are provided in the first separation space and the second separation space, respectively.

The first jetting device includes a first group of nozzles 5A having nozzles arranged in a row in the first separation space and a pneumatic supply (not illustrated in the figures) connected to the first group of nozzles 5A. Moreover, the second jetting device includes a second group of nozzles 5B having nozzles arranged in a row in the second separation space and a pneumatic supply (not illustrated in the figures) connected to the second group of the nozzles 5B.

The first jetting device can blow off the first pieces 2A in the first separation space by airflow discharged in the pulse-like manner from a particular nozzle selected from the first group of nozzles 5A.

The second jetting device blows off the second pieces 2B toward a place different from the place toward which the first pieces 2A are blown off, in the second separation space, by airflow discharged in the pulse-like manner from a particular nozzle selected from the first group of nozzles 5B.

The current plate 7 is placed along the trajectory of the group of pieces 2 as a separation subject, and guides airflow generated by the blower 6 in a stable condition.

The upper current plates 7A, which is a kind of the current plate 7, extend from the conveyor 1 in the direction in which the pieces 2A, 2B, 2C, and 2D (the group of pieces 2) are thrown forward, and are provided above the trajectories of the pieces 2A, 2B, 2C, and 2D (the trajectory of the group of pieces 2) thrown forward. In the present embodiment, the width of the upper current plate 7A is not less than the width of the slit nozzle head of the blower 6 (the length in the Y-axis direction) or the effective width of the conveyor 1. Moreover, the two upper current plates 7A are provided. One of the two upper current plates 7A covers the area ranging from the slit nozzle head of the blower 6 to the first group of nozzles 5A. The other covers the area ranging from the first group of nozzles 5A to the second group of nozzles 5B.

The lower current plate 7B as a kind of the current plate 7 is provided below the trajectories of the pieces 2A, 2B, 2C, and 2D (the trajectory of the group of pieces 2) thrown forward. In the present embodiment, the width of the lower current plate 7B is not less than the width of the slit nozzle head of the blower 6 (the length in the Y-axis direction) or the effective width of the conveyor 1. Moreover, the lower current plate 7B protrudes downward in the conveying direction, from the conveying end 4 of the conveyor 1 or a position near the conveying end 4, along the trajectory of the group of pieces 2.

In the present embodiment, the upper current plates 7A and the lower current plate 7B are provided to sandwich the trajectories of the pieces 2A, 2B, 2C, and 2D as the separation subjects from above and below, along the trajectories. Moreover, the start end of the lower current plate 7B is along the surface of the conveyor, and the upper surface of the lower current plate 7B is below the trajectories of the pieces 2A, 2B, 2C, and 2D as the separation subjects.

The upper current plate 7A and the lower current plate 7B control the airflow 9 around the trajectories of the pieces 2A, 2B, 2C, and 2D as the separation subjects. The upper current plate 7A and the lower current plate 7B can adjust the current of the airflow 9 from the blower 6 and away from the conveyor 1 so as to obtain the desired trajectories of the pieces 2A, 2B, 2C, and 2D.

The pieces 2A and pieces 2B of particular materials separated from the trajectories of the pieces 2A, 2B, 2C, and 2D as the separation subjects (the trajectory of the group of the pieces 2), by a jetting device are kept separated from the other pieces, using the first separation plate 8A and the second separation plate 8B (hereinafter, also collectively referred to as "separation plate"). In the present embodiment, the separation plates 8A and 8B are provided below the trajectories of the pieces 2A, 2B, 2C, and 2D (the trajectory of the group of small pieces 2). The separation plates 8A and 8B extend in the vertical direction (the Z-axis direction), and each have a width which is not less than the width of the conveyor 1 (in the Y-axis direction). The first separation plate 8A and the second separation plate 8B are provided parallel with the first group of nozzles 5A. The first separation plate 8A is closer to the conveyor 1 than the second separation plate 8B is. The first separation plate 8A is taller than the second separation plate 8B. The height of the first separation plate 8A and the height of the second separation plate 8B are designed by taking into account the trajectories of the pieces 2A, 2B, 2C, and 2D (the group of pieces 2). Moreover, the separation plates 8A and 8B may take any shapes as long as the first pieces 2A and the second pieces 2B cannot pass through. For example, the separation plates 8A and 8B may have many holes, may be mesh plates, or may be grid plates.

It should be noted that the present invention is not limited to the above embodiment. For example, another embodiment of the present invention may be achieved by optionally combining the structural elements described in this description or excluding some of the structural elements. Moreover, the present invention includes a modification obtained by making various changes, which those skilled in the art would conceive, to the above embodiment, without departing from the scope of the present invention, that is, the meaning of the wording of the claims.

The following describes a separation method.

FIGS. 1a to 1c illustrate in sequence processes for separating the pieces 2A and the pieces 2B of particular target materials, from the pieces 2A, 2B, 2C, and 2D (the group of pieces 2) as separation subjects conveyed by the conveyor 1. For instance, the conveyor 1 has a head pulley having a radius of 170 mm, and can be operated at a conveying speed of 2 m/s or 3 m/s.

In the process illustrated in FIG. 1a, the conveyor 1 conveys the pieces 2A, 2B, 2C, and 2D as the separation subjects in the conveying direction (the X-axis direction). Here, the first pieces 2A and the second pieces 2B are particular target materials.

In the process illustrated in FIG. 1b, the pieces 2A, 2B, 2C, and 2D (the group of pieces 2) as the separation subjects are passing under the detecting device 3, and the material types, positions, and others of the separation subjects are distinguished. Moreover, the blower 6 continuously supplies the airflow 9 in the conveying direction of the conveyor 1, from an area near the conveying end 4 of the conveyor 1. Here, the airflow 9 is supplied to a range greater than or equivalent to the effective width of the conveyor 1 (the width across which the group of pieces 2 can be conveyed). That is, the airflow 9 is steadily supplied across the processes in FIGS. 1a to 1c. Moreover, the upper current plates 7A and the lower current plate 7B make the airflow 9 generated by the blower 6 stable.

In the process illustrated in FIG. 1c, the pieces 2A, 2B, 2C, and 2D as the separation subjects distinguished by the detecting device 3 are thrown forward from the conveying end 4. The pieces 2A, 2B, 2C, and 2D (the group of pieces 2) are carried by the airflow 9 and travel a predetermined trajectory. The upper current plates 7A and the lower current plate 7B make the airflow 9 generated by the blower 6 stable. This can stabilize the trajectory of the group of pieces 2 carried by the airflow 9.

Here, when the first pieces 2A of the particular target material pass below the first group of nozzles 5A, air is discharged in the pulse-like manner only from a nozzle corresponding to the pieces 2A, in the first group of nozzles 5A. The first pieces 2A of the particular target material are blown off and separated from the trajectories of the pieces 2A, 2B, 2C, and 2D (the group of pieces 2) as the separation subjects. In the present embodiment, the direction in which the first pieces 2A are blown off is a direction crossing the trajectory of the first pieces 2A, more specifically, a direction substantially perpendicular to a tangent line to the trajectory, and a direction in which the first pieces 2A can clear the first separation plate 8A.

The pieces 2B, 2C, and 2D (the group of pieces 2) continue to travel the trajectory. When the second pieces 2B of the particular target material pass below the second group of nozzles 5B, air is discharged in the pulse-like manner only from a nozzle corresponding to the pieces 2B, in the first group of nozzles 5B. The first pieces 2B of the particular target material are blown off and separated from the trajectories of the pieces 2B, 2C, and 2D (the trajectory of the group of pieces 2) as the separation subjects. In the present embodiment, the direction in which the second pieces 2B are blown off is a direction crossing the trajectory of the second pieces 2B, more specifically, a direction substantially perpendicular to a tangent line to the trajectory and the direction in which the second pieces 2B are blown off to fall between the first separation plate 8A and the second separation plate 8B.

It should be noted that the representative trajectories of the pieces 2A, 2B, 2C, and 2D as the separation subjects are represented by a solid line, a broken line, and a dashed-dotted line.

When leaving the conveying end 4 of the conveyor 1, the group of pieces 2 as the separation subject is thrown forward from the conveying end 4 and travels through the air. Here, by being thrown forward, the separation subjects of different shapes and sizes are affected by air resistance in the directions in which the separation subjects are traveling. Sizes and vectors are different depending on the separation subject. Therefore, air resistance differs depending on the separation subject.

The first group of nozzles 5A and the second group of nozzles 5B as jetting devices placed ahead of the conveyor control the timing of jetting based on time represented by, for example, an encoder value. The times when the pieces 2A and the pieces 2B pass below the first group of nozzles 5A or the second group of nozzles 5B need to be the same even if the pieces 2A and the pieces 2B are successively thrown forward and travelling through the air from the conveying end 4. Otherwise, the pieces 2A and the pieces 2B cannot be accurately blown off. Thus, separation accuracy cannot be improved.

Therefore, the blower 6 discharges the airflow 9 (assist blow) at a similar speed, in the conveying direction, from behind the conveying end 4 or an area near the conveying end 4 so that air resistances which affect the traveling group of pieces 2 as the separation subject are as equal (stable) as possible. By so doing, times from when the pieces 2A and the pieces 2B are thrown forward into the air at the conveying speed of the conveyor 1 until when the first group of nozzles 5A or the group of nozzles 5B discharges pulse air can be as equal as possible. Thus, the air resistance which affects the traveling group of pieces 2 can be reduced by the blower 6 blowing the separation subjects.

Moreover, a pulley part including the conveying end 4 is a rotator. Preferably, the air flow 9 should be prevented from flowing in the direction of rotation (along the direction of rotation), and the airflow generated by the supplier should accurately flow in the conveying direction. Therefore, the effects of an operation in the direction of rotation should be excluded. The provision of the lower current plate 7B can suppress the airflow 9 flowing in the direction of rotation. Moreover, the provision of the upper current plate 7A can suppress the airflow 9 diffusing upward. Thus, the diffusion of the airflow 9 can be suppressed. It is possible to achieve a uniform velocity of airflow by reducing air resistance for the travel of the group of pieces 2 thrown forward from the conveying end 4, with the airflow 9 generated from the blower 6 and by the upper current plate 7A and the lower current plate 7B controlling the airflow.

Thus, according to the configuration of the device described above, the separation method can reduce margin of error in trajectories due to differences in shape or specific gravity of the pieces 2A, 2B, 2C, and 2D as the separation subjects. Therefore, in the trajectories of the pieces 2A, 2B, 2C, and 2D, the first pieces 2A of the particular material can be accurately blown off by air from the first group of nozzles 5A. In the trajectories ahead, the second pieces 2B can be accurately blown off by air from the second group of nozzles 5B. Therefore, in the travels of the pieces 2A, 2B, 2C, and 2D, pieces of two kinds of materials can be separated from pieces of other materials with a high degree of accuracy.

It should be noted that in the embodiment with reference to FIGS. 1a to 1c and FIG. 2, the first pieces 2A and the second pieces 2B are separated by being blown downward by pulse air discharged downward from the first group of nozzles 5A and the second group of nozzles 5B placed above the trajectories of the pieces 2A, 2B, 2C, and 2D as the separation subjects. However, the first group of nozzles 5A and the second group of nozzles 5B do not have to be positioned above the trajectories of the pieces 2A, 2B, 2C, and 2D. For instance, the first group of nozzles 5A and the second group of nozzles 5B may be provided below the trajectories, and pieces of particular materials may be separated from other pieces by being blown upward by upward air discharged in the pulse-like manner. Moreover, the first group of nozzles 5A may be provided above the trajectories, and the second group of nozzles 5B may be provided below the trajectories, or vice versa. Moreover, other configuration of the groups of nozzles is also possible. For instance, in addition to the first group of nozzles 5A and the second group of nozzles 5B, other group(s) of nozzles may be provided above or below the trajectories. In the present embodiment, the first and second groups of nozzles are used to separate pieces of two kinds of materials. However, this can be, of course, also applied to separation of pieces of one material. Alternatively, if a third group of nozzles is provided to separate at least three kinds of materials, a similar principle can be applied.

The following describes a detailed example of the present invention.

Figure 3A:
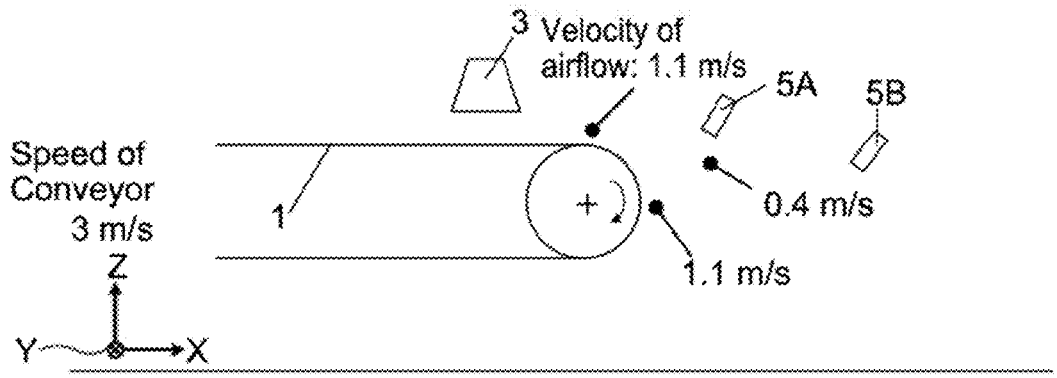
FIG. 3a illustrates generation of airflow near trajectories in the present invention.
Figure 3B:
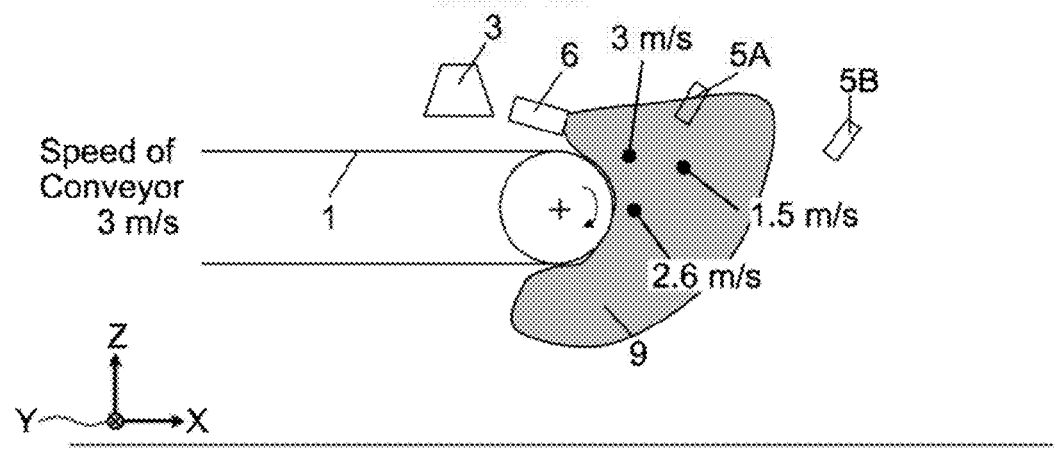
FIG. 3b illustrates generation of airflow near trajectories in the present invention.
Figure 3C:
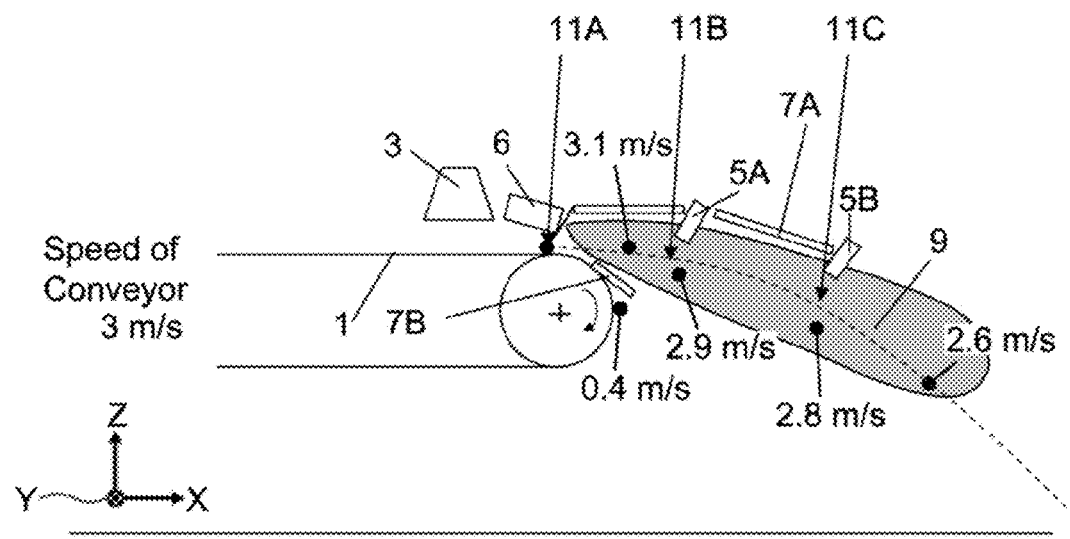
FIG. 3c illustrates generation of airflow near trajectories in the present invention.

FIGS. 3a to 3c illustrate generation of airflow near the conveyor 1 and the trajectories of the pieces 2A, 2B, 2C, and 2D in processes for separating the pieces in the group of pieces 2.

In FIG. 3a, the blower 6 is not generating the airflow 9. FIG. 3a Illustrates generation of airflow near the conveyor 1 running at a conveying speed of 3 m/s and the trajectory of the group of pieces 2. If the conveyor 1 runs at a conveying speed of 3 m/s, airflow of 1.1 m/s occurs on the surface of the conveyor 1. The group of pieces 2 as the separation subject is conveyed to the conveying end 4 at a conveying speed of 3 m/s. However, after passing the conveying end 4, the pieces of the group of pieces 2 are affected by the airflow of 1.1 m/s, and fall in different trajectories. Thus, the pieces cannot be accurately recovered.

In FIG. 3b, the blower 6 is generating the airflow 9. The slit nozzle (Y33768) of Spraying Systems Co. is used for the blower 6. The blower 6 includes a slit nozzle head having a slit width of 1 mm, and can control air quantity using an inverter.

The blower 6 for supplying the airflow 9 continuously supplies the airflow 9 in the conveying direction of the conveyer 1, along the surface of the conveyor and to a range greater than or equivalent to the effective width of the conveyor 1. When the blower 6 supplies the airflow 9 so that the velocity of airflow at the conveying end 4 of the conveyor 1 is 3 m/s, i.e., equivalent to the conveying speed of the conveyor 1, airflow of 1.5 m/s occurs near the trajectories of pieces as separation subjects vertically downward from the first group of nozzles 5A.

However, when the airflow 9 is supplied from the blower 6, airflow increases along the surface of the pulley of the conveyor 1. Therefore, in the condition illustrated in FIG. 3b, the pieces 2A, 2B, 2C, and 2D abruptly fall. Thus, only the simple supply of the uniform airflow 9 from the blower 6 cannot stabilize the travel of the group of pieces 2 as the separation subject. It is important to stabilize the airflow 9 such that the airflow from the blower 6 flows along the direction in which the separation subject travels.

In FIG. 3c, the blower 6 is generating the airflow 9, and the upper current plates 7A and the lower current plate 7B are provided.

The provision of the lower current plate 7B can block the airflow 9 along the surface of the pulley at the end of the conveyor 1. In addition, the provision of the upper current plates 7A can block the airflow 9 flowing upward. Thus, the airflow heads the direction of the trajectories of the pieces 2A, 2B, 2C, and 2D as the separation subjects. The upper current plates 7A have shapes to cover areas above the trajectories other than the first group of nozzles 5A and the second group of nozzles 5B (the upper current plates 7A do not block air from the first group of nozzles 5A and the second group of nozzles 5B). Moreover, the upper current plate 7A is an acrylic board having a thickness of around 3 mm and a length of around 500 mm (and the same width as the effective width of the conveyor 1). The upper current plates 7A and the first and second nozzles are arranged side by side. The lower current plate 7B is an acrylic board having a thickness of 3 mm and a length of 250 mm (and the same width as the effective width of the conveyor 1). When the both sides of the trajectory of the separation subject (the x-z planes in the figures) are covered to improve the enclosure of the trajectory of the separation subject, the uniformity (stability) of the airflow 9 is further improved. The size of the enclosure depends on the configuration of the apparatus. Thus, if the direction in which air is discharged and the trajectories of the pieces are not blocked, the enclosure gives a certain effect.

According to the above configuration, the airflow 9 of 2.9 m/s flows near the trajectories of the pieces as the separation subjects vertically downward from the first group of nozzles 5A. Moreover, the airflow 9 of 2.8 m/s flows near the trajectory of the group of pieces 2 vertically downward from the second group of nozzles 5B. Thus, the combination of the blower 6 and the upper current plates 7A and the lower current plate 7B achieves the control such that the conveying speed of the conveyor 1 and the velocity of airflow observed after the pieces are thrown forward from the conveying end 4 are as close as possible.

The average velocity of airflow was measured at each fixed point to analyze the effects of a uniform velocity of airflow achieved by the blower 6, the upper current plate 7A, and the lower current plate 7B.

FIG. 4 illustrates the results of the average velocities of airflow at an end 11A from which the pieces are thrown forward, i.e., the conveying end 4 of the conveyor 1, at a point 11B at which the pieces pass below the discharge unit of the first group of nozzles 5A, in the trajectories, at a point 11C at which the pieces pass below the discharge unit of the second group of nozzles 5B, in the trajectories. When (X, Z)=(0 mm, 0 mm), the position at which the separation subject passes when blown off by pulse air from the first group of nozzles 5A is (X, Z)=(250 mm, −60 mm), and the position at which the separation subject passes when blown off by pulse air from the second group of nozzles 5B is (X, Z)=(450 mm, −160 mm). Here, X represents a conveying direction from the conveying end 4, and Z represents a gravity direction.

In the following, the above coordinates are represented by the end 11A of the conveyor from which pieces are thrown forward (also, simply referred to as a point 11A), the point 11B at which the pieces pass below the discharge unit of the first group of nozzles, in the trajectories (also, simply referred to as the point 11B), and the point 11C at which the pieces pass below the discharge unit of the second group of nozzles, in the trajectories (also, simply referred to as the point 11C). To be precise, the point 11B and the point 11C change depending on the speed of the conveyor. However, relative comparisons between the points need to be analyzed. Therefore, the measurement was performed using the same coordinates irrespective of the speed of the conveyor. It should be noted that the speed of the conveyor is 3 m/s, and the average velocity of airflow for 60 seconds was measured by a hot wire probe (TESTO 425) as an anemometer. In general, margin of error within plus and minus 10% occur in velocities of airflow from the blower in the measurement and experiment. Therefore, the following focuses on the average velocity of airflow.

In particular, the condition of the velocity of airflow resulted from the airflow 9 which the blower 6 generates at the end 11A from which the pieces are thrown forward (the point 11A) is extremely important. The airflow 9 spreads into the air, from the point 11A to the point 11B, the point 11C. The velocity of airflow measured at each point gradually decreases in the stated order. The following focuses on the results of the velocities of airflow at the respective points.

According to the results in FIG. 4, when the blower 6 was not provided (No. 1), the average velocities of airflow were small at all the point 11A, the point 11B, and the point 11C, and did not reach 3 m/s, which is the speed of the conveyor. This is not a preferable condition since the conveying speed of the separation subject changes from the conveying end 4.

When the blower 6 was provided (No. 2, 3, and 4), the velocities of airflow at the respective points approximated 3 m/s. In No. 2, airflow along the surface of a pulley at the end of the conveyor 1 (head surface) increased as described above. This significantly increased margin of error in velocities of airflow. Therefore, the lower current plate 7B was provided as shown in No. 3. A reduction in margin of error in velocities of airflow at the respective points was observed. The airflow flowing upward also needs to be blocked. Therefore, as shown in No. 4, the upper current plate 7A was provided. This improved the enclosure of the separation subjects. A reduction in margin of error in velocities of airflow below the first group of nozzles 5A and the second group of the nozzles 5B was observed. Thus, the condition in which the average velocities of airflow are the same at the respective points is called uniform velocity of airflow. When the average velocities of airflow approximate the conveying speed of the conveyor 1, the travel condition of the separation subject can be stabilized.

The following describes the effects caused by the position of the blower 6.

Figure 5:
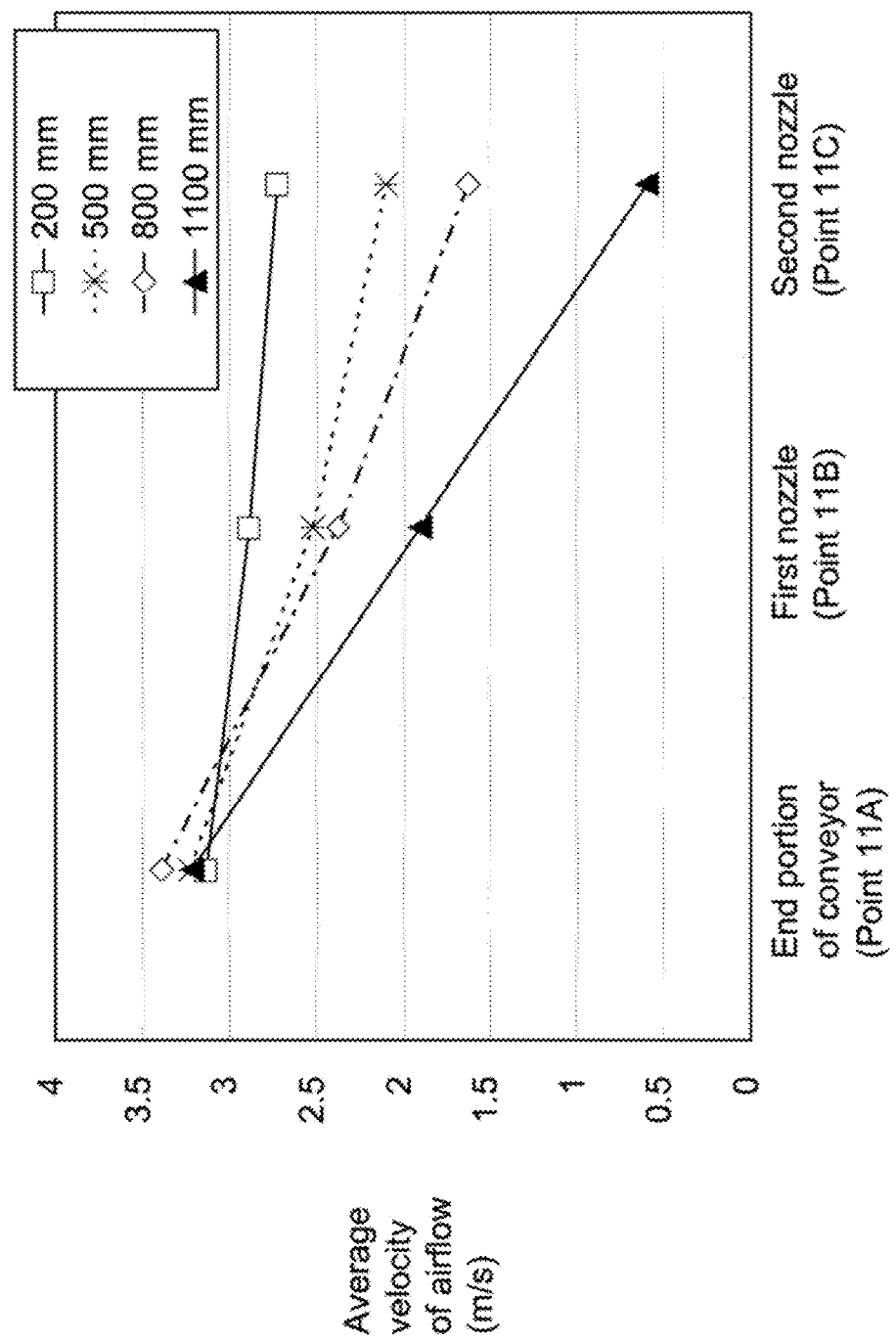
FIG. 5 illustrates the relationship of average velocities at the respective points in the trajectory direction in which the pieces travel, when the installation position of the blower of the present invention was changed.

FIG. 5 illustrates results when the position of the blower was changed.

Here, the average velocity of airflow was measured at each of the points (11A, 11B, and 11C) shown in the horizontal axis. Here, the air outlet (slit nozzle head) of the blower 6 was provided so as to be away from the conveying end 4 in the direction opposite to the conveying direction. It should be noted that the standard point at which the air outlet is installed is the point 11A and the air outlet was moved in the direction away from the standard point (the direction opposite to the conveying direction). For instance, for 500 mm, the blower is installed at the coordinate represented by X=−500 mm. It is clear from FIG. 5 that the closer the blower is to the end 11A of the conveyor from which the pieces are thrown forward (the conveying end 4), the less different and more stable the velocities of airflow at the respective points are. Therefore, preferably, the slit nozzle head, i.e., the air outlet of the blower 6 should be provided as close as possible to the conveying end 4. Meanwhile, differences between the velocities of airflow at the respective points increase with an increase in distance from the air outlet of the blower 6 to the end 11A of the conveyor from which the pieces are thrown forward (conveying end 4). In this case, adjustment of the velocity of airflow near the conveyor to 3 m/s results in the trend that the velocities of airflow near the first group of nozzles and the second group of nozzles decrease. Moreover, when the distance from the end 11A of the conveyor from which the pieces are thrown forward (the conveying end 4) to the installed position of the blower exceeded 800 mm, the velocity of airflow fell below 1 m/s, which is the standard velocity of airflow without the blower 6. Thus, no advantage of a uniform velocity of airflow was available. Therefore, it has been found that the supplier needs to be placed within 800 mm from the end of the conveyor from which the pieces are thrown forward and start travelling through the air.

The separation subject is affected by air resistance most when leaving the position from which the separation subject is thrown forward (the conveying end 4). Provision of the advantages of air distribution only to the area would maintain a feed speed successive to the conveying speed of the conveyor. When the blower is distant from the conveying end, airflow of a sufficient velocity would not be supplied to the areas near the first group of nozzles and the second group of nozzles.

The following analyzes the effects of the angle of the direction in which the blower 6 distributes air.

Figure 6:
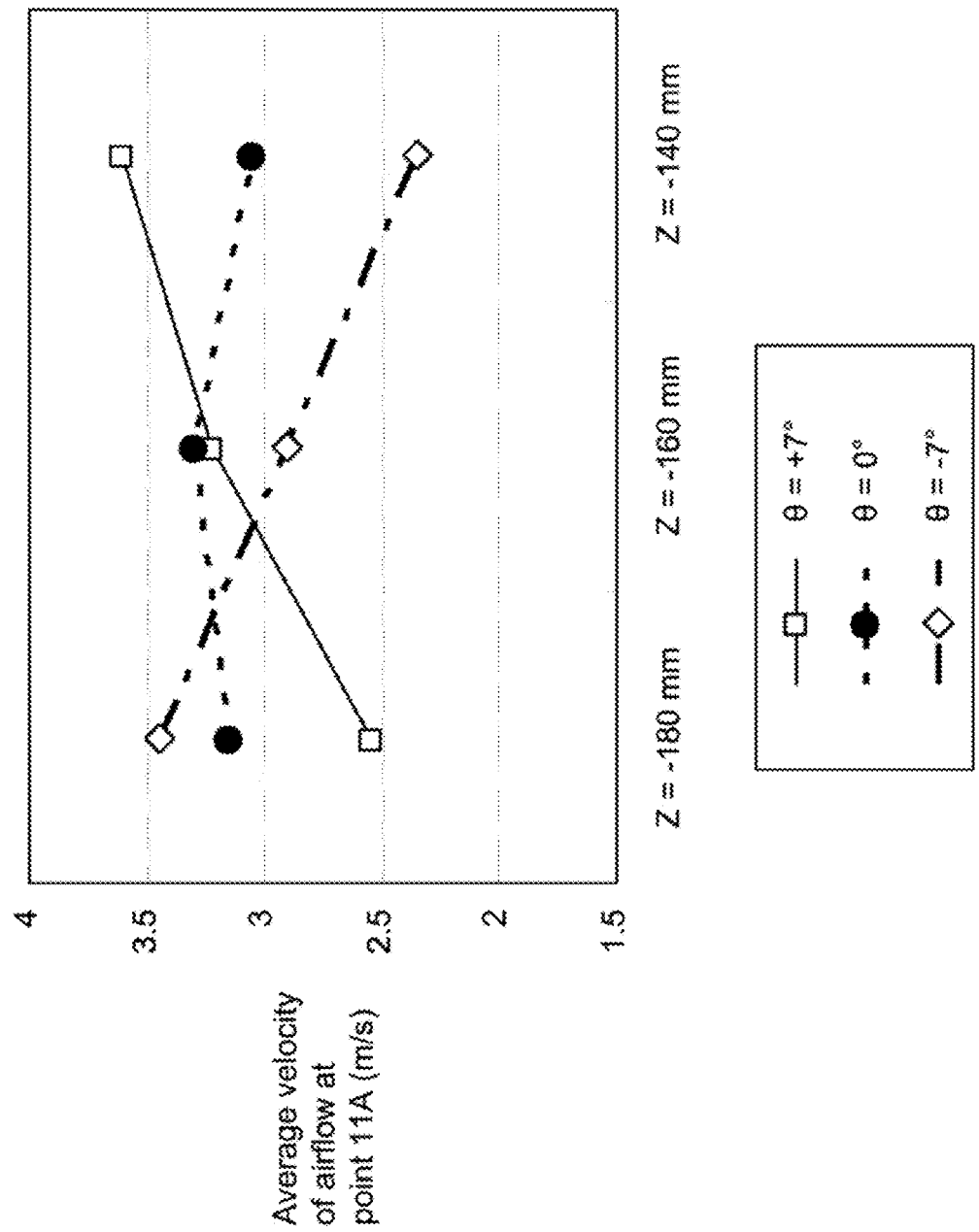
FIG. 6 illustrates the relationship of average velocities at the respective points in the trajectory direction in which the pieces travel, when the installation angle of the blower of the present invention was changed.

FIG. 6 illustrates the results obtained by analyzing velocities of airflow when the direction in which the blower 6 is installed was changed.

The results were obtained by measuring the velocity of airflow for each angle of the direction in which the blower 6 distributes air (each angle of an air outlet). The horizontal axis represents the measurement height of airflow at the position of the group of nozzles 5B. The vertical axis represents the average velocity of airflow at the point 11A.

It is found from the results in FIG. 6 that when the measurement height of airflow near the position of the group of nozzles 5B is changed within plus and minus 40 mm and the air outlet of the blower 6 is installed along the trajectories of the separation subjects, a change in average velocity of airflow is smallest and the center of airflow is at Z=−160 mm. In this condition, the airflow is most stable.

The following also describes the case where the installation angle of the air outlet of the blower 6 was changed by plus and minus 7 degrees in the vertical direction from an angle along the trajectory of the group of pieces 2 as the separation subject. Here, the direction in which the pieces are thrown forward (horizontal direction) is defined as θ=0 degree. This means that when θ=0, i.e., the direction matches the direction in which the separation subject is thrown forward, an effect in the height direction of airflow is smallest. This was found a preferable condition. It should be noted that the installation angle of the air outlet of the blower 6 used in this experimental device is a value which changes depending on the slit shape of the blower 6. Therefore, the angle does not have to be limited to the numerical value described above. Preferably, the installation angle should match the direction in which the separation subjects are thrown forward, depending on the configuration of the blower 6.

Figure 7A:
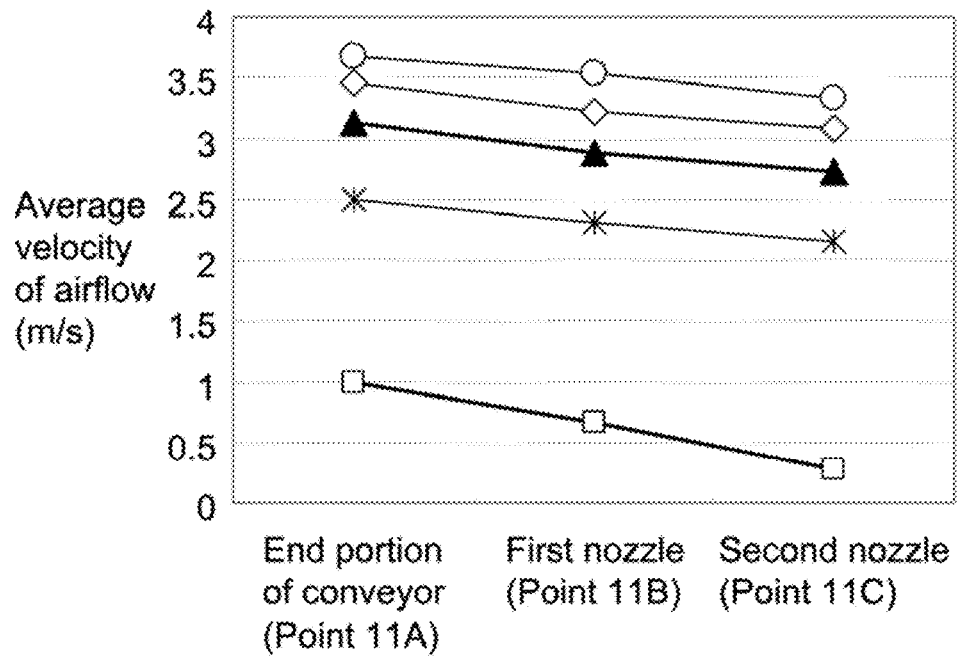
FIG. 7a illustrates the relationship of average velocities at the respective points in the present invention.
Figure 7B:
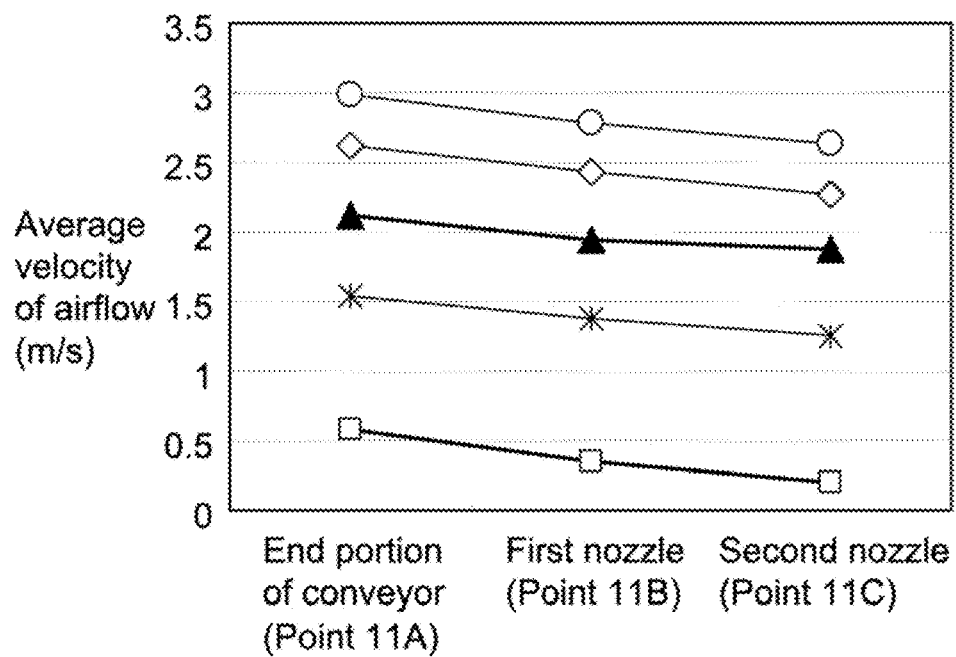
FIG. 7b illustrates the relationship of average velocities at the respective points in the present invention.

FIGS. 7a and 7b illustrate results when the velocity of airflow was changed with the condition in which the upper and lower current plates are provided, which is the condition shown in No. 4 in FIG. 4. It should be noted that in FIG. 7a, the conveying speed of the conveyor is 3 m/s, and in FIG. 7b, the conveying speed of the conveyor is 2 m/s. The effects of rotation of the pulley are different at different conveying speeds of the conveyor. This slightly affects the velocity of airflow. At any conditions, the velocity of airflow gradually decreases from the point 11A toward the point 11B, the point 11C.

FIG. 13 illustrates results obtained by measuring margin of error in travels for the velocities of airflow measured in FIGS. 7a and 7b to analyze the effects of the condition of the velocity of airflow on recovery of materials as the separation subjects. FIG. 13 illustrates the results of margin of error in the travels of resin materials due to different velocities of airflow at the point 11A.

Samples used as the separation subjects are resin materials of small particle sizes produced when a home appliance made of resin are crushed into pieces by a crusher. Therefore, PP resin materials of 7.5 mm×7.5 mm×a thickness of 2 mm were used. Moreover, the conveying speed of the conveyor 1 is 3 m/s. The experiment was performed with the condition shown in No. 4 in FIG. 4, i.e., the condition in which the blower 6, the upper current plate 7A, and the lower current plate 7B are provided. The measurement was performed by an image analysis software, using a high speed camera (DITECT Co. Ltd., HAS-L1M, 500FPS) to calculate margin of error in the travels of the pieces to the point 11C at which the pieces pass below the second group of nozzles 5B. FIG. 13 illustrates results obtained by calculating margin of error in the travels from differences in the times when the respective samples (pieces) reached the point 11C at which the samples pass below the second group of nozzles 5B, in the trajectories. It should be noted that the calculation was performed assuming that the travelling speed of the pieces in the conveying direction is 3 m/s, which is the speed of the conveyor.

As FIG. 13 illustrates, when the velocity of the airflow 9 near the conveying end 4 approximates 3 m/s, which is the conveying speed of the conveyor 1, margin of error in the travels of the resin materials are minimized. Thus, the velocity of the airflow was most stable at 3.18 m/s, which is the closest velocity to the speed of the conveyor. The margin of error in the travels increased at the velocities of airflow greater than the speed of the conveyor. Therefore, it was found that preferably, the conveying speed of the conveyor 1 and the velocity of the airflow 9 near the conveying end 4 should match or substantially match.

FIG. 14 illustrates the results of measurement of margin of error in the travels when the speed of the conveyor is 2 m/s. The other conditions are the same as those in FIG. 13. For a conveying speed of the conveyor 1 of 2 m/s, when the velocity of the airflow 9 near the conveying end 4 approximates 2 m/s, which is the conveying speed of the conveyor, margin of error in the travels of the pieces are minimized. The velocity of the airflow 9 was most stable at 2.12 m/s, which is the closest velocity to the conveying speed of the conveyor 1. When the velocity of the airflow 9 near the conveying end 4 was greater than the conveying speed of the conveyor 1, margin of error in the travels of the pieces increased. Therefore, even if the speed of the conveyor is 2 m/s, it was found that preferably, the conveying speed of the conveyor 1 and the velocity of the airflow 9 near the conveying end 4 should match or substantially match as above.

Figure 8A:
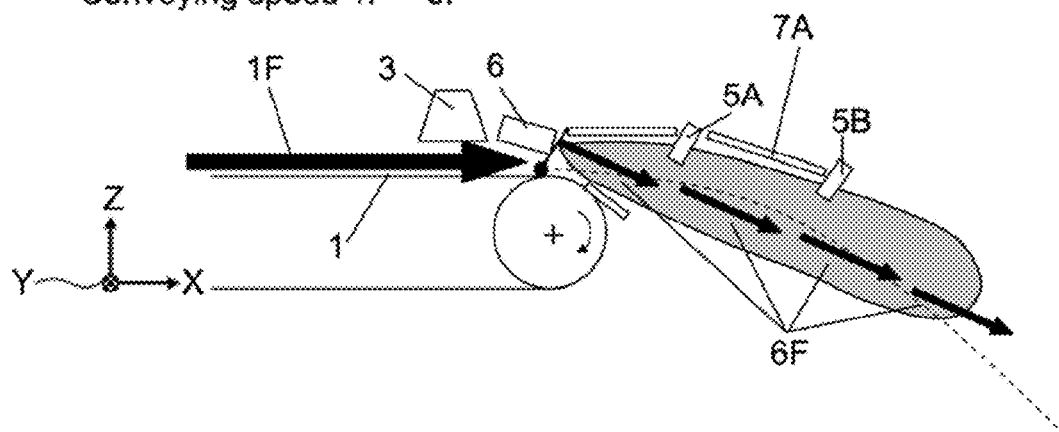
FIG. 8a illustrates a relationship between the speed of the conveyor and the velocity of airflow in the present invention.
Figure 8B:
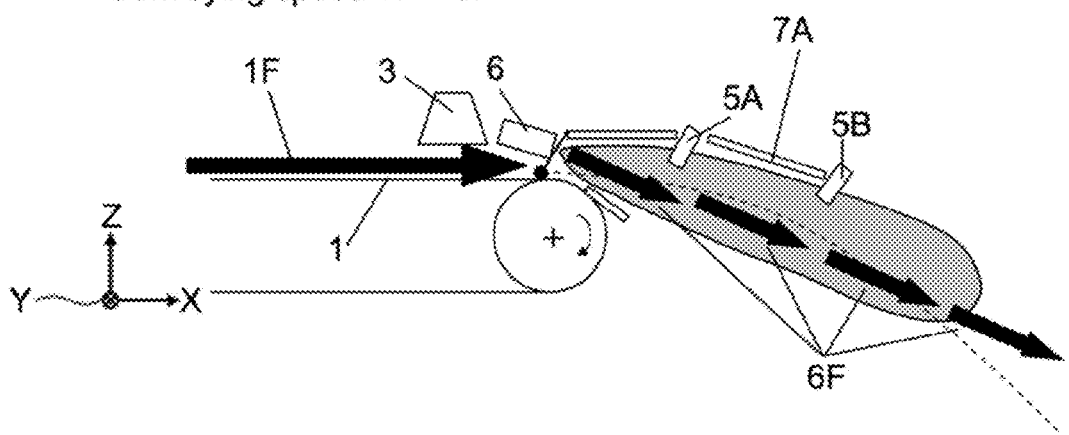
FIG. 8b illustrates a relationship between the speed of the conveyor and the velocity of airflow in the present invention.
Figure 8C:
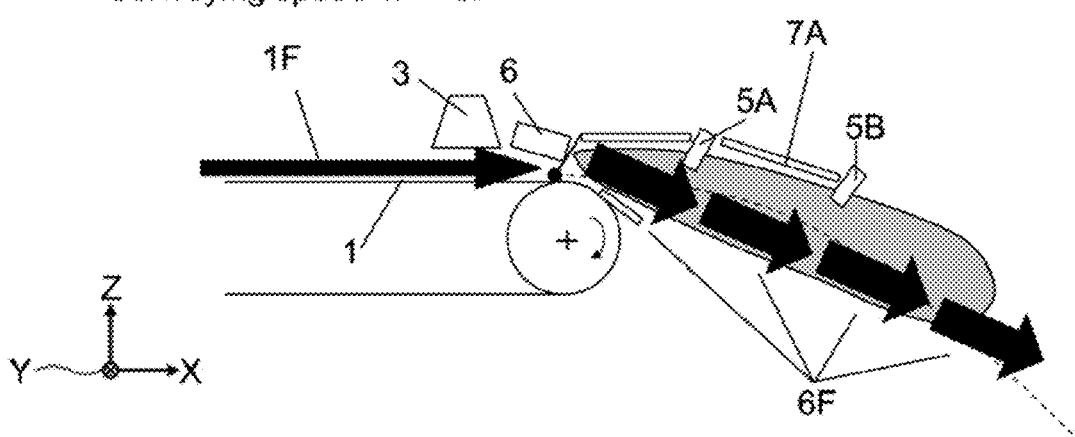
FIG. 8c illustrates a relationship between the speed of the conveyor and the velocity of airflow in the present invention.

The following analyzes the relationship between the speed of the conveyor and the velocity of airflow with reference to the results illustrated in FIGS. 13 and 14. FIGS. 8a to 8c are schematic diagrams illustrating the relationship between the speed of the conveyor 1 and the velocity of airflow from the blower, which is an important factor to decrease margin of error in travels. Here, the conveying speed of the conveyor 1 is defined as 1F while the velocity of airflow from the blower 6 is defined as 6F. The magnitude relationship between 1F and 6F largely affects the margin of error in travels. The sizes of the arrows in FIGS. 8a to 8c represent the magnitudes of the velocities of airflow.

In FIG. 8a, the relationship 1F>6F holds. The blower 6 supplies assist air for the conveying speed of the conveyor 1. This decreases the air resistance which affects separation subjects. Thus, the margin of error in travels is slightly reduced.

In FIG. 8b, the relationship 1F=6F holds. The blower 6 supplies airflow having a velocity which is the same as the conveying speed of the conveyor 1. Therefore, there is no air resistance for the separation subjects. Thus, the margin of error in travels is minimized. This is the most preferable results among FIGS. 8a to 8c.

In FIG. 8c, the relationship 1F<6F holds. The blower 6 supplies air having a velocity faster than the conveying speed of the conveyor 1. Thus, a fair wind is supplied behind the separation subjects. This makes the travels of the separation subjects unstable and increases the margin of error in the travels.

From the above results, an embodiment illustrated in FIG. 8b is preferable, and it is most important to maintain the velocity of airflow. Thus, arbitrary setting of the condition of the velocity of airflow, depending on the speed of the conveyor can stabilize margin of error in travels.

Figure 9:
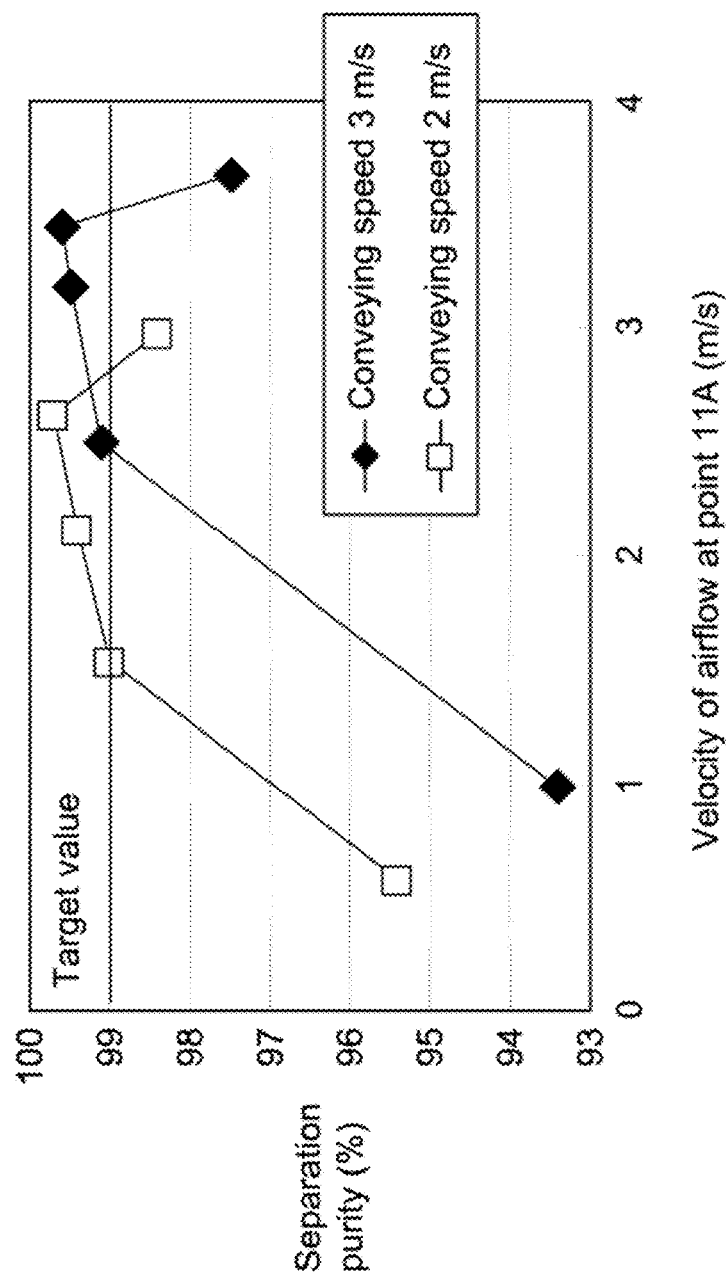
FIG. 9 illustrates the separation purity and recovery rate of pieces of a target resin according to an embodiment of the present invention.
Figure 10A:
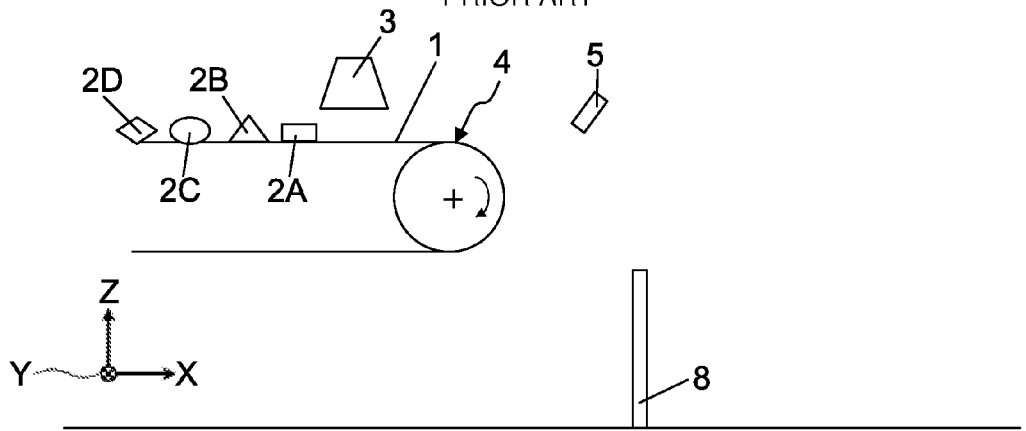
FIG. 10a is a side view illustrating a conventional separation apparatus.
Figure 10B:
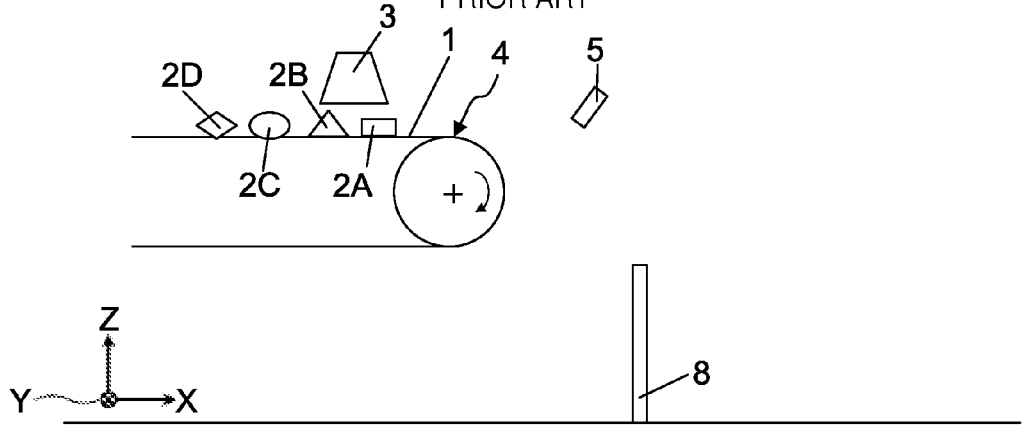
FIG. 10b is a side view illustrating the conventional separation apparatus.
Figure 10C:
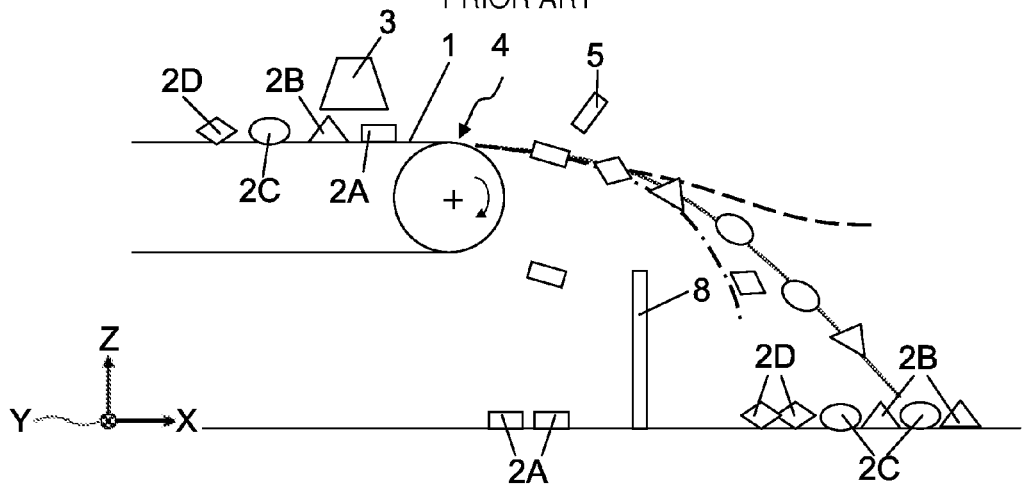
FIG. 10c is a side view illustrating the conventional separation apparatus.
Figure 11:
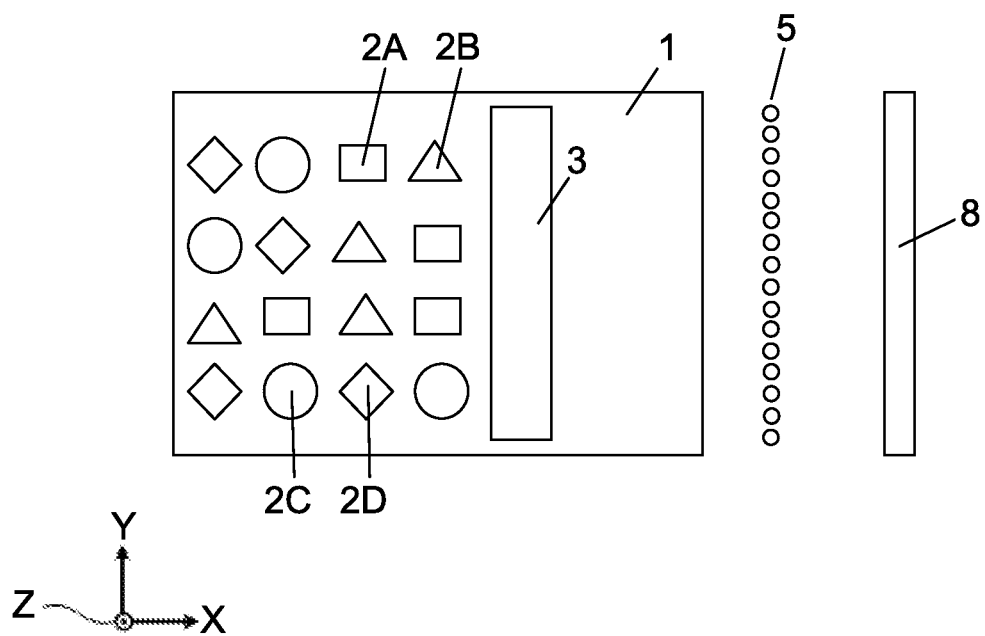
FIG. 11 is a plan view illustrating the conventional separation apparatus.
Figure 12A:
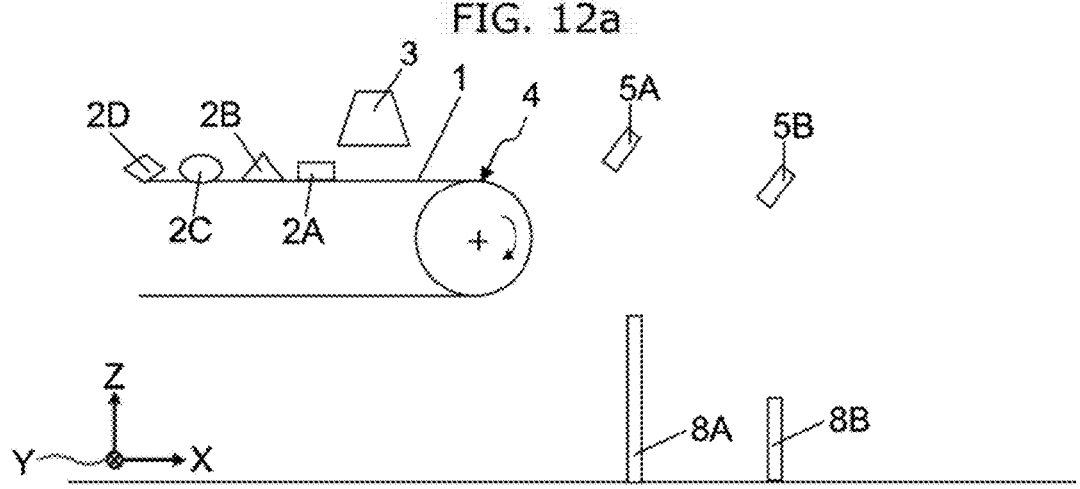
FIG. 12a is a side view illustrating a conventional separation apparatus.
Figure 12B:
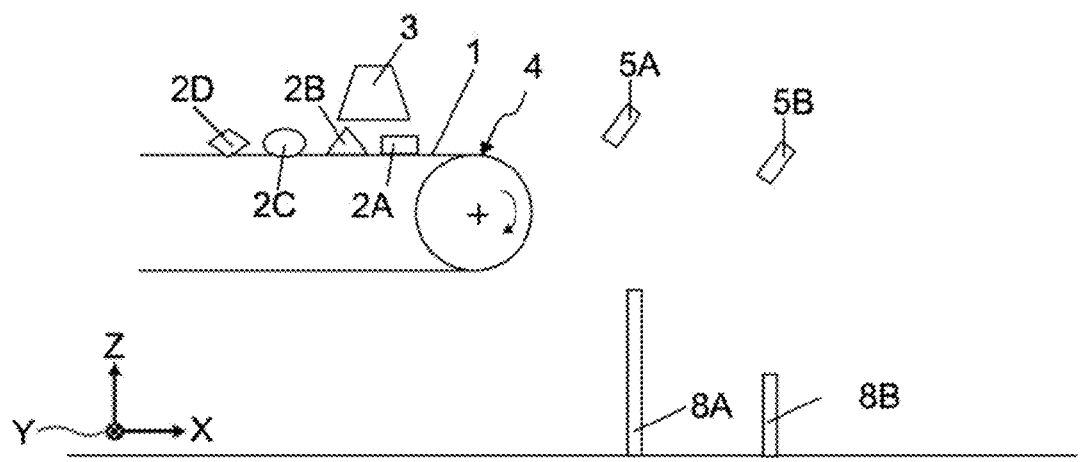
FIG. 12b is a side view illustrating the conventional separation apparatus.
Figure 12C:
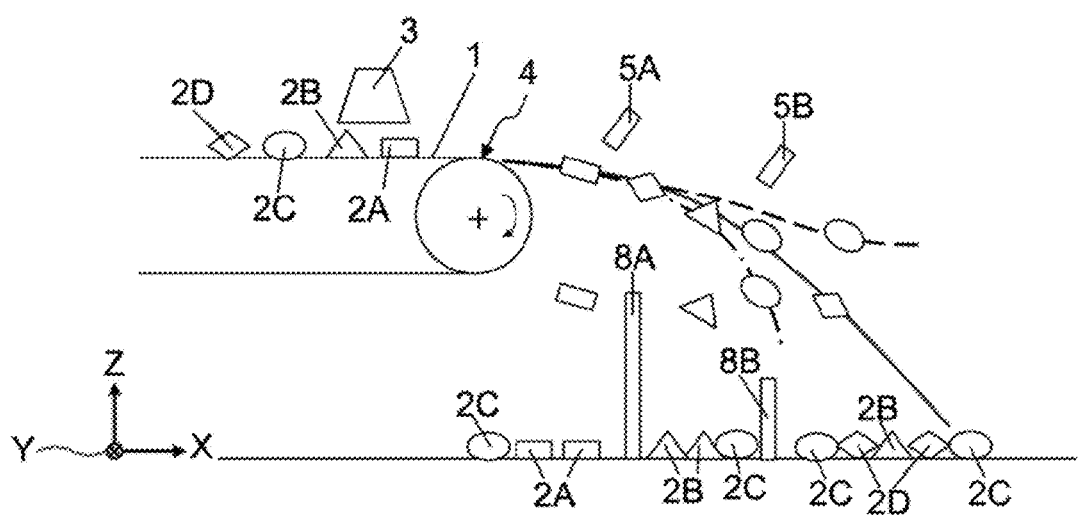
FIG. 12c is a side view illustrating the conventional separation apparatus.

FIG. 9 illustrates separation purity when pieces of PP and pieces of ABS are separated from the trajectory of the group of pieces 2 by two groups of nozzles. 240 samples (pieces) having large and small particle sizes ranging from 7.5 mm square to 500 mm square were separated three times. Average values were employed. The quantity of air from the blower 6 was gradually changed, and the range of the velocity of airflow at the point 11A is adjusted from 0.27 m/s to 4 m/s as illustrated in the horizontal axis. Moreover, the separation purity and the recovery yield were calculated from the equation below.

Separation purity (%)=(Weight of recovered target resin/Weight of recovered resin)×100

For a conveying speed of the conveyor 1 of 3 m/s, the highest separation accuracy was obtained when the velocity of airflow at the point 11A (the conveying end 4) is 3 m/s, which is close to the conveying speed of the conveyor 1. This leads to the analysis below. The improved uniformity of the velocity of airflow reduces margin of error in travels. Therefore, the mixture of different materials was prevented substantially. Thus, high separation purity was obtained.

A target separation purity is often set to 99% to enable material recycling in which recovered recycling materials are close to general-purpose virgin resins in physical properties. With reference to FIG. 9, to obtain a separation purity of at least 99%, the velocity of airflow at the point 11A needs to fall within the range from 2.51 m/s to 3.45 m/s. Moreover, with reference to FIG. 7a, when the conveying speed of the conveyor is 3 m/s, it is necessary to set the velocity of airflow at the point 11A to fall within the range from 2.51 m/s to 3.45 m/s such that margin of error in travels are within 44 mm.

When the conveying speed of the conveyor is 2 m/s, a high degree of separation accuracy was obtained around a velocity of airflow of 2 m/s at the point 11A (the conveying end 4). Moreover, the separation purity is at least 99% when the velocity of airflow at the point 11A falls within the range from 1.54 m/s to 2.62 m/s. Moreover, with reference to FIG. 7b, when the conveying speed of the conveyor is 2 m/s, it is necessary to set the velocity of airflow at the point 11A (the conveying end 4) to fall within the range from 1.54 m/s to 2.62 m/s such that margin of error in travels are within 34 mm.

The following was found from the above results. The value of B/A needs to be within plus and minus 0.15 of 1 where A m/s represents the conveying speed of the conveyor, and B m/s represents the ratio of the velocity of airflow at the end of the conveyor in the conveying direction of the conveyor. Preferably, the velocity of the airflow 9 at the end in the conveying direction of the conveyor 1 (the conveying end 4) should match the conveying speed of the conveyor 1.

FIG. 15 illustrates separation purities and recovery yields when the pieces of PP were blown off by the first group of nozzles 5A and the pieces of ABS were blown off by the second group of nozzles 5B, with the condition that the velocity of airflow is 3 m/s at the point 11A (the conveying end 4), which resulted in the best separation accuracy in FIG. 9. Moreover, results obtained from the conventional separation method are also illustrated for comparing the advantages.

Recovery yield (%)=(Weight of recovered target resin/Weight of target resin contained in the group of pieces 2 before separation)×100

Implementation of the separation apparatus and the separation method described above can achieve a high separation purity and recovery yield both for the pieces of PP and the pieces of ABS. In particular, the recovery yield significantly improved from the recovery yield in the conventional separation method, regarding the pieces of ABS separated by the second group of nozzles 5B which is more distant from the conveyor 1 than the first group of nozzles 5A is. The reduction in margin of error in travels reduces undesired mixture of different materials. Thus, the separation purity improved especially in the group.

It should be noted that the present invention is not limited to the above embodiment. For example, another embodiment of the present invention may be achieved by optionally combining the structural elements described in this description or excluding some of the structural elements. Moreover, the present invention includes a modification obtained by making various changes, which those skilled in the art would conceive, to the above embodiment, without departing from the scope of the present invention, that is, the meaning of the wording of the claims.

INDUSTRIAL APPLICABILITY

The present invention can improve the separation purity and recovery yield of pieces of a particular target material even if pieces of two kinds of materials are independently separated in the trajectories. The present invention is applicable to recycling of resources as a separation apparatus and a separation method for recycling pieces of a particular material in discarded home appliances and domestic wastes.

REFERENCE SIGNS LIST 1 conveyor
1F Conveying speed ahead of the conveyor
2 group of pieces
2A first group of pieces
2B second group of pieces
3 detecting device
4 conveying end
5 group of nozzles
5A first group of nozzles
5B second group of nozzles
6 blower
6F velocity of airflow from a blower
7A upper current plate
7B lower current plate
8A first separation plate
8B second separation plate
9 airflow
10 separation apparatus
11A coordinates at the end of conveyor from which pieces are thrown forward
11B point at which pieces pass below the discharge unit of the first group of nozzles, in the trajectories
11C point at which pieces pass below the discharge unit of the second group of nozzles, in the trajectories

The invention claimed is:

1. A separation method for separating a piece of a particular material and a piece of other material which are mixed in a separation subject, the separation method comprising:
   placing the separation subject on a first end portion or a middle portion of a conveyor;
   conveying the separation subject placed on the conveyor in a conveying direction toward a second end portion of the conveyor;
   detecting, by a detecting device, a composition of the piece of the particular material placed on the conveyor;
   generating, by a blower above the second end portion of the conveyor, an airflow having a velocity matching or substantially matching a conveying speed of the conveyor;
   stabilizing the airflow by current plates disposed along a trajectory of the separation subject by sandwiching the trajectory of the separation subject in a vertical direction, using an upper current plate and a lower current plate which are included in the current plates, the upper current plate covering an area ranging from the blower above the second end portion to a jetting device, the lower current plate being provided below the trajectory of the separation subject and protruding downward in the conveying direction from the second end portion; and
   by the jetting device, obtaining position information of the piece of the particular material detected, and jetting pulse air toward the piece of the particular material when the piece of the particular material, which is travelling through air from the conveyor and whose travel is assisted by the airflow, passes by the jetting device,
   wherein, the jetting device includes a first group of nozzles and a second group of nozzles,
   wherein the upper current plate is one of a plurality of upper current plates,
   and
   wherein a first one of the upper current plates is disposed between the blower and the first group of nozzles and a second one of the upper current plates is disposed between the first group of nozzles and the second group of nozzles.

2. A separation method for separating a piece of a particular material and a piece of other material which are mixed in a separation subject, the separation method comprising:
   placing the separation subject on a first end portion or a middle portion of a conveyor;
   conveying the separation subject placed on the conveyor in a conveying direction toward a second end portion of the conveyor;
   detecting, by a detecting device, a composition of the piece of the particular material placed on the conveyor;
   generating, by a blower above the second end portion of the conveyor, an airflow having a velocity matching or substantially matching a conveying speed of the conveyor;
   stabilizing the airflow by current plates disposed along a trajectory of the separation subject by sandwiching the trajectory of the separation subject in a vertical direction, using an upper current plate and a lower current plate which are included in the current plates, the upper current plate covering an area ranging from the blower above the second end portion to a jetting device, the lower current plate being provided below the trajectory of the separation subject and protruding downward in the conveying direction from the second end portion; and
   by the jetting device, obtaining position information of the piece of the particular material detected, and jetting pulse air toward the piece of the particular material when the piece of the particular material, which is travelling through air from the conveyor and whose travel is assisted by the airflow, passes by the jetting device,
   wherein, the jetting device includes a first group of nozzles and a second group of nozzles,
   wherein the upper current plate is one of a plurality of upper current plates,
   wherein a first one of the upper current plates is disposed between the blower and the first group of nozzles and a second one of the upper current plates is disposed between the first group of nozzles and the second group of nozzles, and
   wherein a distance from the second end portion to the second group of nozzles is a maximum of 450 mm.

* * * * *